(12) United States Patent
Maehara

(10) Patent No.: US 7,438,160 B2
(45) Date of Patent: Oct. 21, 2008

(54) FLOATING CALIPER DISC BRAKE

(75) Inventor: Toshifumi Maehara, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 229 days.

(21) Appl. No.: 11/223,920

(22) Filed: Sep. 13, 2005

(65) Prior Publication Data

US 2006/0054430 A1  Mar. 16, 2006

(30) Foreign Application Priority Data

Sep. 15, 2004  (JP)  .................. P. 2004-268165

(51) Int. Cl.
  *F16D 55/00*  (2006.01)
(52) U.S. Cl. .................. 188/73.31; 188/73.38
(58) Field of Classification Search ............. 188/73.31, 188/73.35, 73.36, 73.37, 73.38
  See application file for complete search history.

(56) References Cited

U.S. PATENT DOCUMENTS

| | | | | | |
|---|---|---|---|---|---|
| 2,909,246 | A | * | 10/1959 | Hodkinson | 188/73.32 |
| 3,605,956 | A | * | 9/1971 | Hahm et al. | 188/72.3 |
| 3,917,033 | A | | 11/1975 | Rath et al. | 188/73.3 |
| 4,111,285 | A | | 9/1978 | Hönick | 188/73.6 |
| 4,392,559 | A | * | 7/1983 | Oshima | 188/73.32 |
| 4,394,891 | A | * | 7/1983 | Oshima | 188/73.38 |
| 4,498,564 | A | | 2/1985 | Tamura | 188/73.32 |
| 4,515,249 | A | * | 5/1985 | Escarabajal et al. | 188/73.38 |
| 5,069,314 | A | * | 12/1991 | Madzgalla et al. | 188/73.36 |
| 5,947,234 | A | * | 9/1999 | Shimazaki | 188/73.36 |
| 2003/0136617 | A1 | * | 7/2003 | Gherardi et al. | 188/73.38 |

FOREIGN PATENT DOCUMENTS

| | | |
|---|---|---|
| GB | 2 417 301 A | 2/2006 |
| JP | U-54-103488 | 7/1979 |
| JP | 56-105129 | 8/1981 |
| JP | 58-25894 B | 5/1983 |
| JP | 61-21620 Y | 6/1986 |
| JP | 2002-98174 | 4/2002 |

* cited by examiner

*Primary Examiner*—Robert A. Siconolfi
*Assistant Examiner*—Vu Q Nguyen
(74) *Attorney, Agent, or Firm*—Morgan, Lewis & Bockius LLP

(57) ABSTRACT

A caliper 2a is disposed between rotation input side and rotation output side engagement portions 8, 9 of a support member 3a so as to restrict the movement of the caliper 2a in a circumferential direction of a rotor 1. A guide pin 26 which supports the caliper 2a is passed through guide holes 22 formed in pressure plates 11 which make up respective pads 10b in such a manner as to be capable of sliding in an axial direction of the rotor 1, whereby the caliper 2a is supported on the respective pads 10b attachably and detachably to the support member 3a while being allowed to move in the axial direction of the rotor 1 relative to the respective pads 10b.

5 Claims, 23 Drawing Sheets

FLOATING CALIPER DISC BRAKE

The present application claims foreign priority based on Japanese Patent Application No. P.2004-268165, filed on Sep. 15, 2004, the contents of which are incorporated herein by reference.

BACKGROUND OF THE INVENTION

1. Field of the Invention

The present invention relates to a floating caliper disc brake used for applying brakes on a vehicle.

2. Related Art

As disc brake assemblies for applying brakes on vehicles, there are floating caliper disc brake assemblies. In the floating caliper disc brake, a caliper is supported relative to a support member in such a manner as to be freely displaced in an axial direction and a cylinder and a piston are provided on only one side of the caliper relative to a rotor.

In the floating caliper type of disc brakes, there are proposed various constructions depending on holding and sliding methods of calipers. In a construction referred to as pin-slide type, a caliper is supported by a guide pin on a support member in such a manner as to be freely displaced. FIGS. 21 to 24 illustrate one of the pin-slide type floating caliper disc brakes that is described in JP-B-58-025894. The pin-slide type floating caliper disc brake is used for motor cycles, and in the disc brake, when the brakes are applied, a caliper 2 is displaced relative to a rotor 1 that rotates together with a wheel (not shown). In such a state that the disc brake is mounted on a vehicle, a support member 3, which is provided in such a manner as to be adjacent to one side to the rotor 1, is fixed to a front fork 43 of a vehicle body via mount holes 4, 4. In addition, the caliper 2 is supported on the support member 3 in such a manner as to be capable of being displaced in an axial direction of the rotor 1.

Due to this, a guide pin 5 and a guide hole 6 are provided in parallel with a center axis of the rotor 1, respectively, in a lug portion 47a that is provided at one end portion (an upper end portion in FIG. 21, and a left end portion in FIG. 22) of the caliper 2 with respect to a rotational direction of the rotor 1 and in an arm portion 49 that is provided at an end portion (the upper end portion in FIG. 21, and the left end-portion in FIG. 22) of the support member 3 with respect to the rotational direction of the rotor 1 as well. Then, the guide pin 5 is inserted in the guide hole 6 in such a manner as to slide freely in the axial direction. A bellows 7 is provided between an outer circumferential surface of a proximal end portion of the guide pin 5 and an opening of the guide hole 6.

In addition, a U-shaped notch is formed in a lug portion 47 provided at the other end portion (a lower end portion in FIG. 21) of the caliper 2, and a distal half portion (a right half portion in FIG. 23) of a rotation preventive or anti-rotation pin 45, which is fixedly provided on the support member 3 in parallel with the center axis of the rotor 1, is disposed inside the notch so formed. Then, both end portions of a wire spring 46, which is provided in such a manner as to straddle an outer circumferential surface of the distal half portion of the anti-rotation pin 45, are locked on internal surfaces of portions situated at both sides of the notch 44 by the lug portion 47b of the caliper 2. In this configuration, the anti-rotation pin 45 is brought into engagement with the notch 44 via the wire spring 46. In addition, in the caliper 2, a cylinder portion 12 and a claw portion 13 are connected to each other via a bridge portion, and a piston 14 is fittingly mounted in the cylinder portion 12 in a fluid-tight fashion so that an inner side (widthwise inward of the vehicle, and a lower side in FIG. 22 and a right side in FIG. 23) pad 10a is pressed against the rotor 1.

When applying the brakes, a pressurized oil is sent into the interior of the cylinder portion 12, so that a lining 15 of the inner side pad 10a is pressed against an internal surface of the rotor 1 from right to left as viewed in FIG. 23. Then, the caliper 2 is displaced downwards as viewed in FIG. 22 and rightwards as viewed in FIG. 23 as a reaction of the pressing force so applied based on the slide of the guide pin 5 and the anti-rotation pin 45 with respect to the guide hole 6 and the wire spring 46, respectively, and the claw portion 13 presses a lining 15 of an outer side (widthwise outer side of the vehicle, and an upper side in FIG. 22 and a left side in FIG. 23) pad 10b against an external surface of the rotor 1. As a result, the rotor 1 is held strongly by the pads on both the internal and external surfaces thereof to thereby apply the brakes.

In the case of the pin-slide type floating caliper disc brake illustrated in FIGS. 21 to 24, since the guide pin 5 is connected to the caliper 2, a through hole 50 needs to be formed (a hole machining process needs to be performed) in the lug portion 47a provided on the caliper 2 so that a guide pin 5 connecting bolt 48 is passed therethrough. In addition, the guide hole 6 needs to be formed (a hole machining process needs to be performed) in the support member 3 so that the guide pin 5 is fitted therein. Furthermore, an anti-rotation pin 45 connecting threaded hole 51 needs to be formed in the support member 3, and the U-shaped notch 44 needs to be formed in the lug portion 47b of the caliper 2 for engagement of the pin 45. Due to this, many pieces of troublesome machining work are involved, and this causes an increase in production costs. Moreover, not only the anti-rotation pin 45 but also the fixing and engagement portions of the anti-rotation pin 45 are provided, and this causes an increase in weight.

Note that JP-Y-61-021620 also discloses a related-art with respect to the present invention.

SUMMARY OF THE INVENTION

One or more embodiments of the present invention provide a floating caliper disc brake having an inexpensive and light construction and which can reduce the troublesome machining work.

In accordance with one or more embodiment of the present invention, a floating caliper disc brake is provided with a support, a pair of pads and a caliper.

Among them, the support member is fixed to a vehicle body at a position adjacent to a rotor that rotates together with a corresponding wheel.

In addition, the pair of pads are disposed at both sides of the rotor and are guided by the support member so that the pads can move in an axial direction of the rotor.

Additionally, the caliper has a claw portion that is provided at one end portion of a bridge portion which straddles the rotor and the pair of pads and a cylinder portion that is provided at the other end portion of the bridge portion and in which a piston is fittingly mounted.

Then, the pair of pads are pressed against sides of the rotor as the piston is pushed out, whereby the brakes are applied.

Moreover, the caliper is disposed between a pair of arm portions of the support member which are provided in such a manner as to be separated apart from each other in a circumferential direction of the rotor so as to be kept from moving in the circumferential direction of the rotor. Further, the caliper is supported by supporting means provided between the pair of pads in such a manner as to be attachably and detachably to the support member while being allowed to move in the axial direction of the rotor with respect to the respective pads.

In the case of the floating caliper disc brake configured as has been described above, the caliper is disposed between the arm portions provided on the support member in such a manner as to be separated apart from each other in the circumferential direction of the rotor. Due to this, the movement of the caliper in the circumferential direction of the rotor is restricted to thereby realize the prevention of the rotation of the caliper. Moreover, in the case of the embodiments of the present invention, being different from the conventional construction illustrated in FIGS. 21 to 24, the anti-rotation pin which realizes the prevention of the rotation of the caliper does not have to be connected to the support. In addition, the U-shaped notch which is intended to engage with the anti-rotation pin does not have to be formed in the caliper, whereby the caliper can be manufactured inexpensively.

In addition, in the case of the embodiments of the present invention, being different from the conventional construction illustrated in FIGS. 21 to 24, the caliper does not have to be made capable of moving in the axial direction of the rotor with respect to the support member by virtue of the slide of the guide pin connected to the caliper with respect to the guide hole formed in the support. Due to this, it is possible to obviate the necessities of using the bolt which connects the guide pin to the caliper, forming the through hole in the caliper in order for the bolt to be passed therethrough and forming the guide hole in the support member in order for the guide pin to be passed therethrough, thereby making it possible to obtain a construction that is light in weight and low in costs.

Moreover, in accordance with one or more embodiments of the present invention, the supporting means is preferably made up of hole portions provided in, respectively, the claw portion and the cylinder portion of the caliper in such a manner as to face each other via an opening provided in the bridge portion in such a manner as to penetrate therethrough in a radial direction of the rotor and a guide pin that is fitted in the hole portions and which is passed through through holes provided in the pair of pads. According to this preferable configuration, a more inexpensive construction can be obtained.

Alternatively, in accordance with one or more embodiments of the present invention, the supporting means is preferably made up of a holding member that is kept from moving in a radially outward direction of the rotor through engagement with the pair of pads and a locking member that keeps the caliper from moving the radial direction of the rotor through engagement with the holding member that is caused to project outwards of the bridge portion from an opening provided in the bridge portion in such a manner as to penetrate therethrough in the radial direction of the rotor.

In addition, in accordance with one or more embodiments of the present invention, it is more preferable that the holding member is formed into a shape with a substantially C-shaped cross section that straddles the rotor and which is made to open radially inwards of the rotor, and that the pair of pads are such as to fit in the holding member at a projection thereof which projects in the radial direction of the rotor in a substantially T-shaped fashion and to be capable of moving in the axial direction of the rotor.

Additionally, in accordance with one or more embodiments of the present invention, it is more preferable that the holding member is passed through the opening provided in the caliper from inward to outward with respect to the radial direction of the rotor and that the locking member that is kept from moving radially inwards of the rotor in such a state that the locking member is placed on the caliper is inserted in the axial direction of the rotor in an inside of a portion of the holding member which projects outwards of the bridge portion from the opening. As a result, in the embodiments, neither hole portion nor through hole has to be formed in the caliper and respective pads in order for the guide pin to be passed therethrough, and this facilitates further the realization of cost reduction.

In addition, in accordance with one or more embodiments of the present invention, it is more preferable that the pair of pads are guided in such a manner as to be capable of moving in the axial direction of the rotor relative to the support member through engagement of a recessed groove provided on one of the pair of pads and the support member with a raised portion provided on the other thereof. Note that while the recessed groove can be formed into not only a shape with a U-shaped cross section but also various shapes with an L-shaped cross section and the like, from the viewpoint of facilitating the restriction on the displacement of the pads toward both the sides of the rotor in the radial direction thereof relative to the support, the shape with the U-shaped cross section is preferred.

Other aspects and advantages of the invention will be apparent from the following description and the appended claims.

REFERENCE NUMERALS

Figure 1:
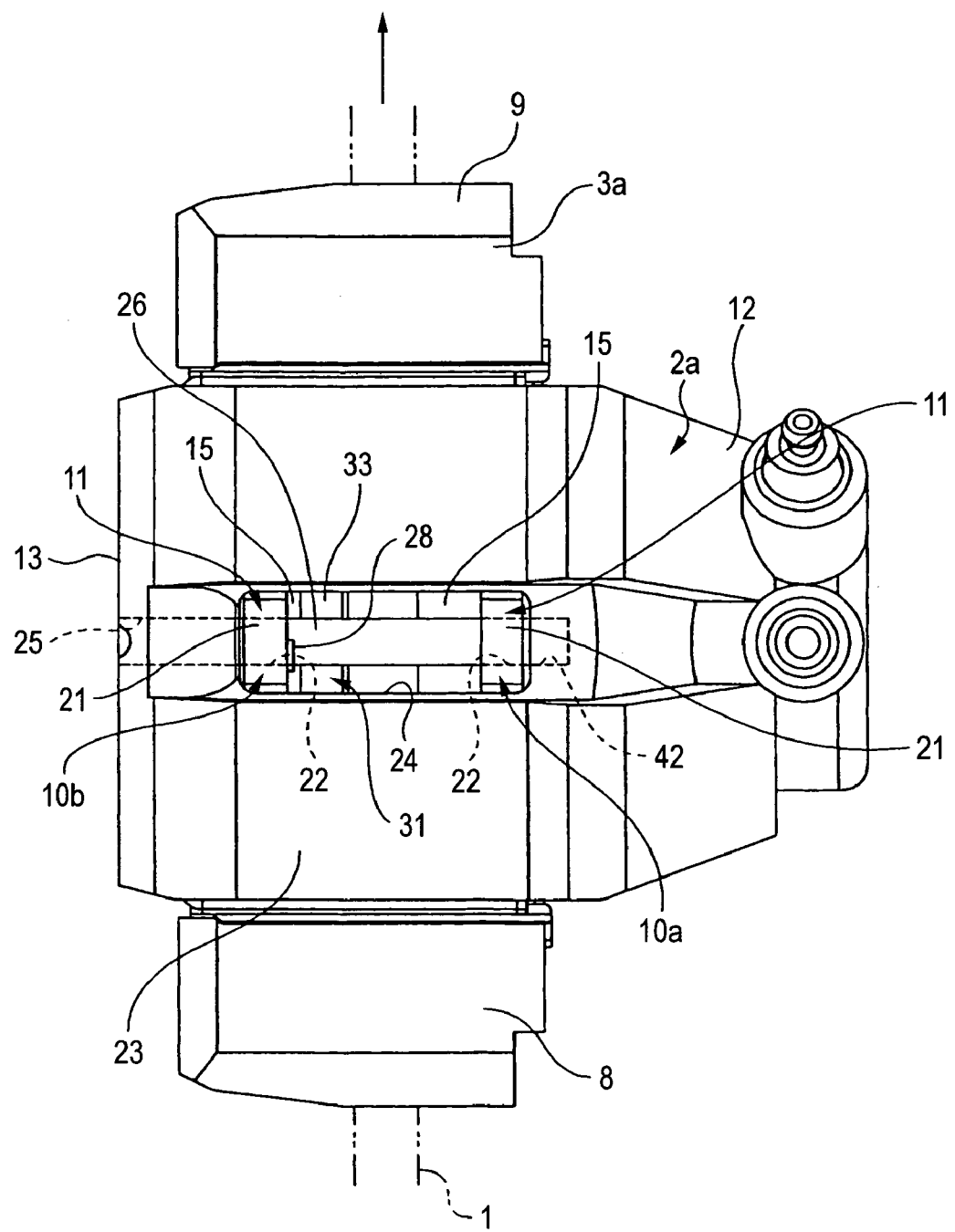
FIG. 1 is a view showing a floating caliper disc brake of a first embodiment seen from an outside with respect to a radial direction of a rotor.
Figure 2:
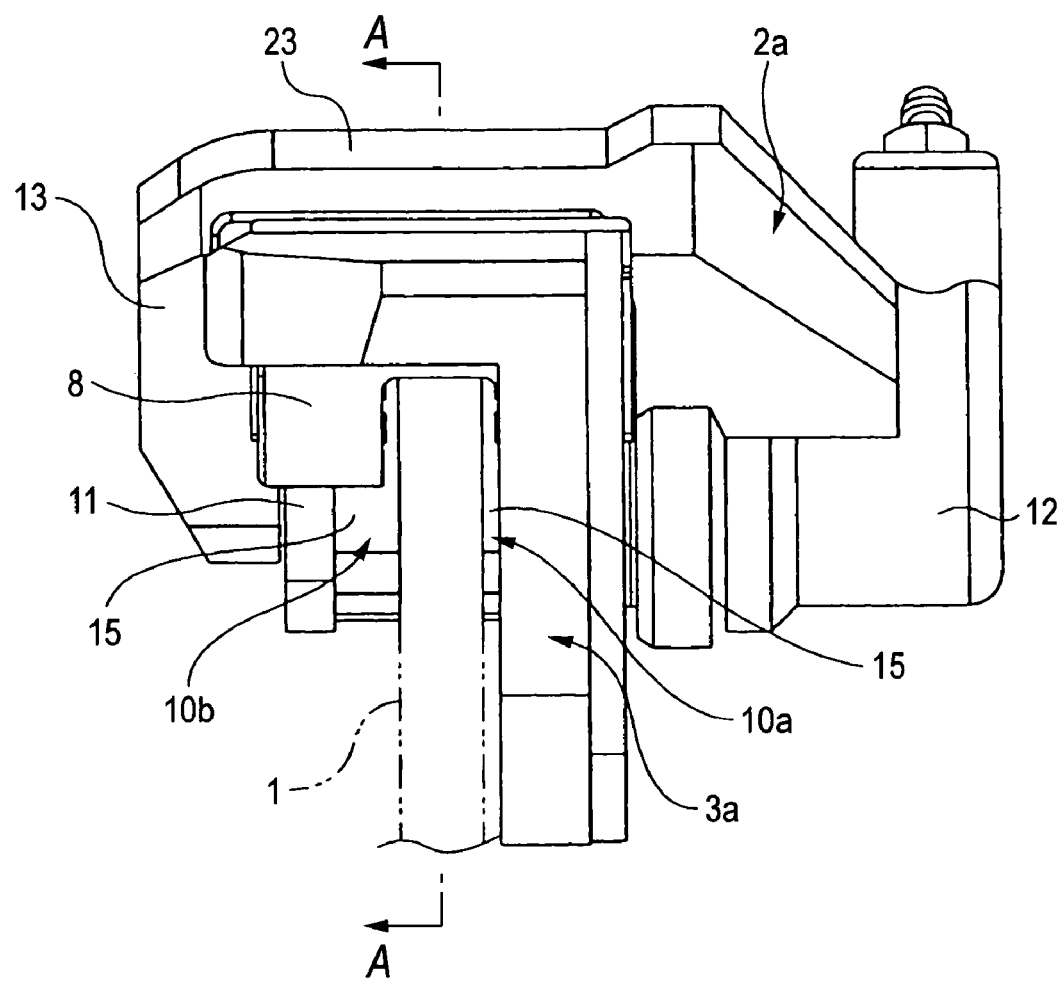
FIG. 2 is a view showing the floating caliper disc brake of FIG. 1 seen from below.
Figure 3:
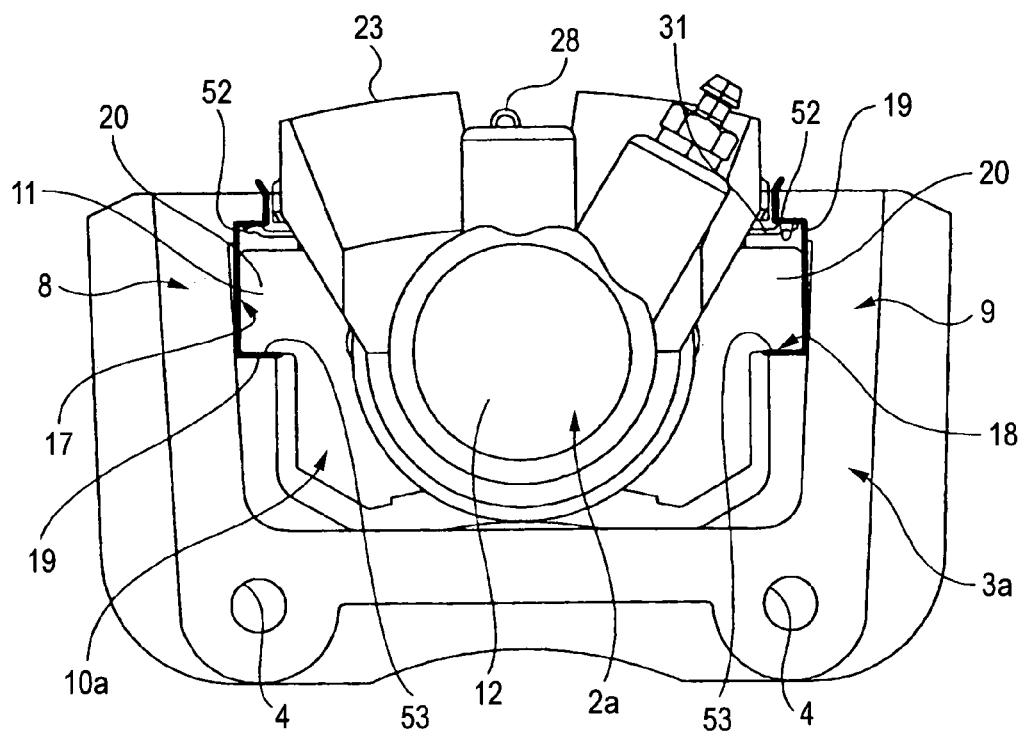
FIG. 3 is a view showing the floating caliper disc brake of FIG. 2 seen from the right.
Figure 4:
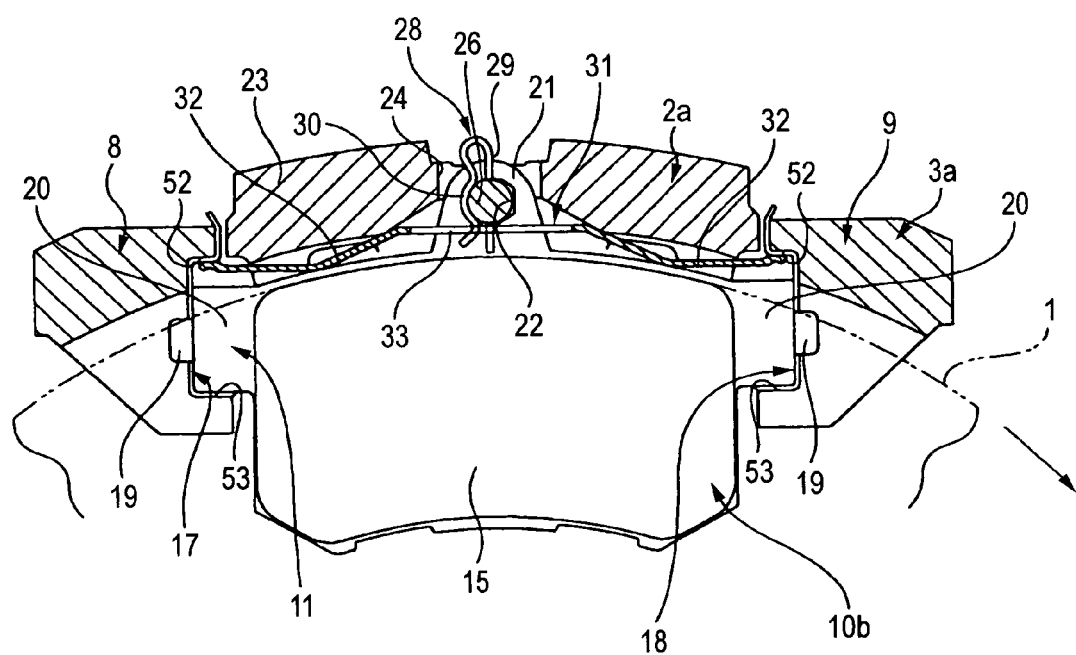
FIG. 4 is a sectional view taken along the line A-A in FIG. 2.
Figure 5:
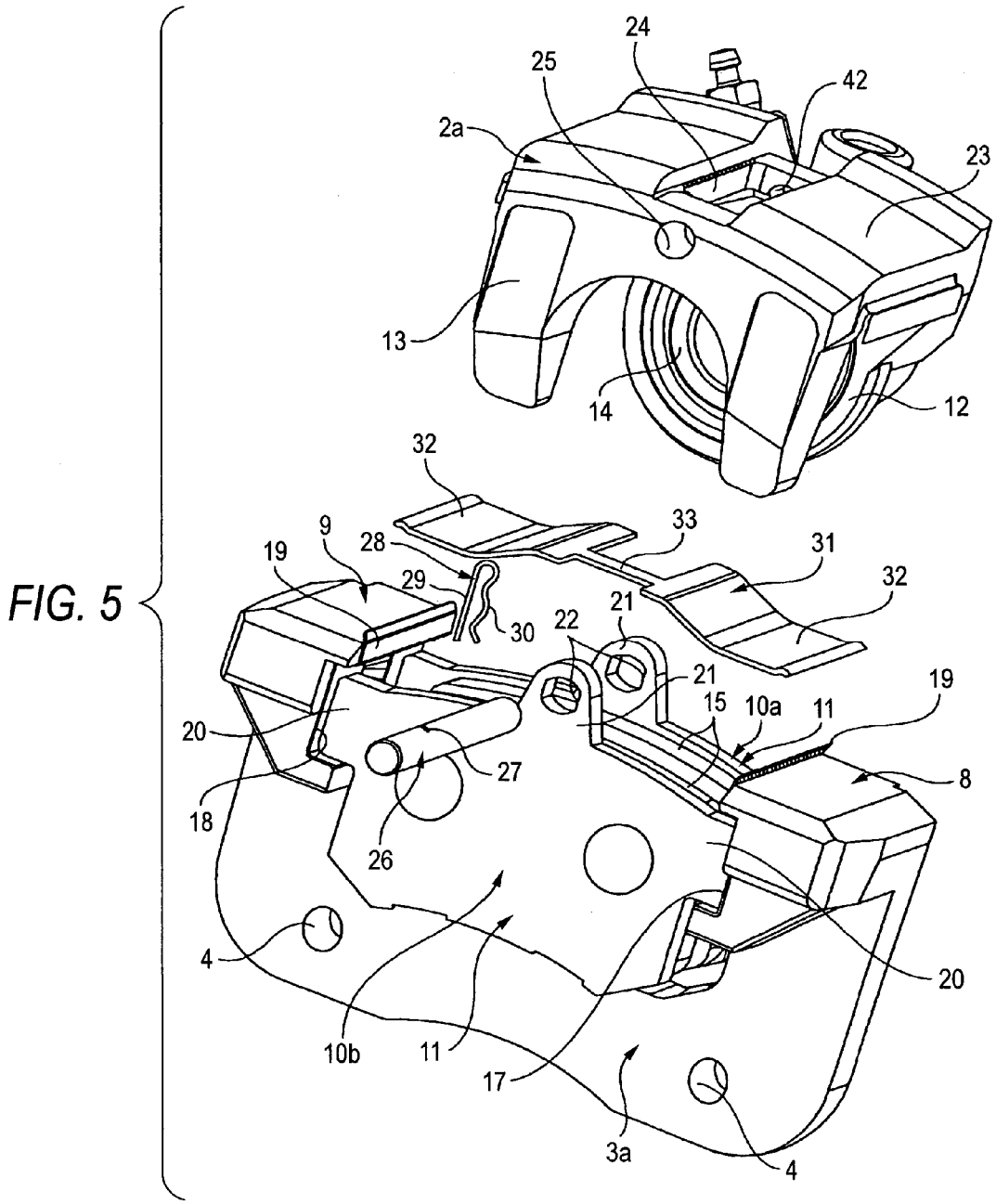
FIG. 5 is an exploded perspective view of the floating caliper disc brake of the first embodiment.
Figure 6:
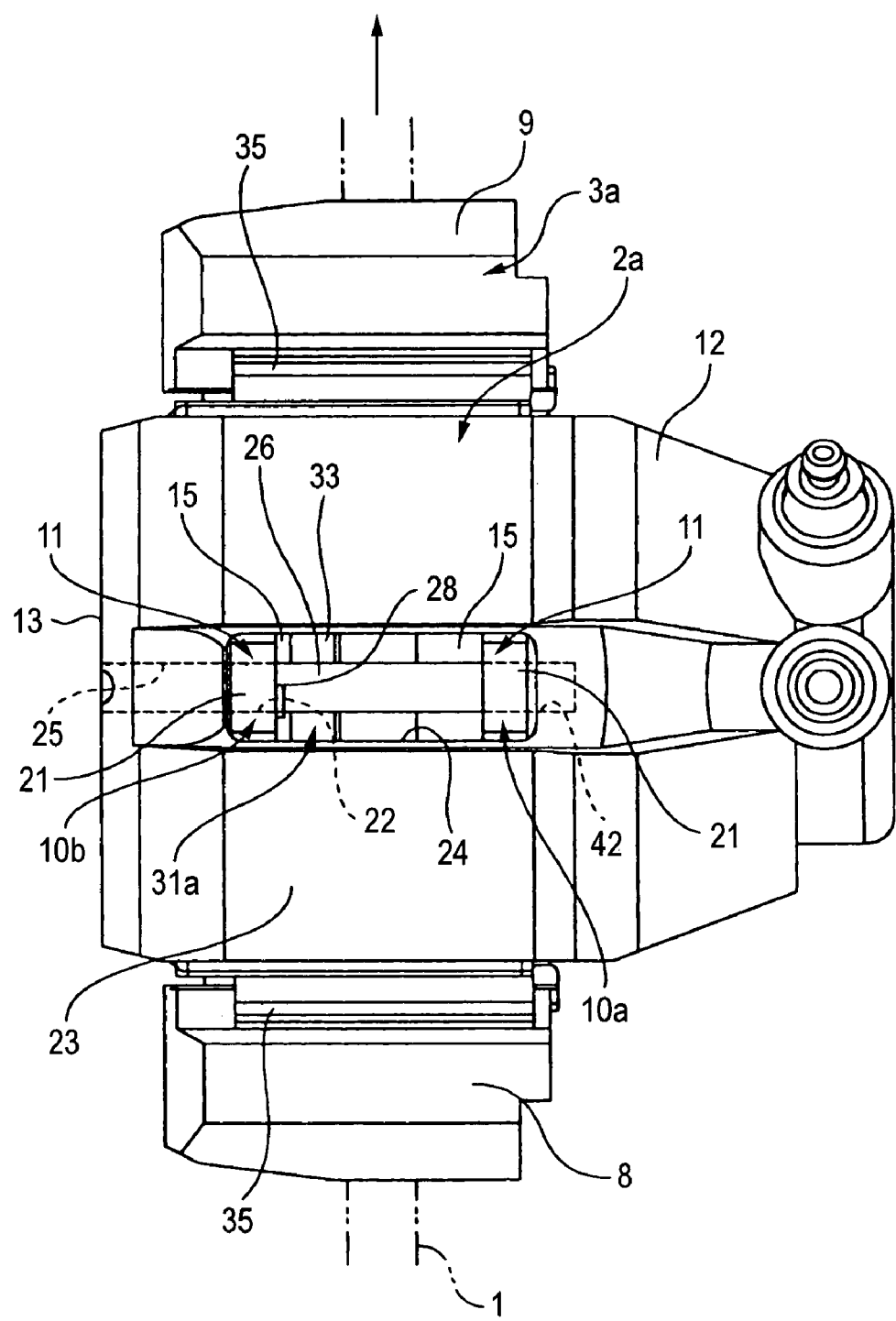
FIG. 6 is a view showing a floating caliper disc brake of a second embodiment seen from an outside with respect to a radial direction of a rotor.
Figure 7:
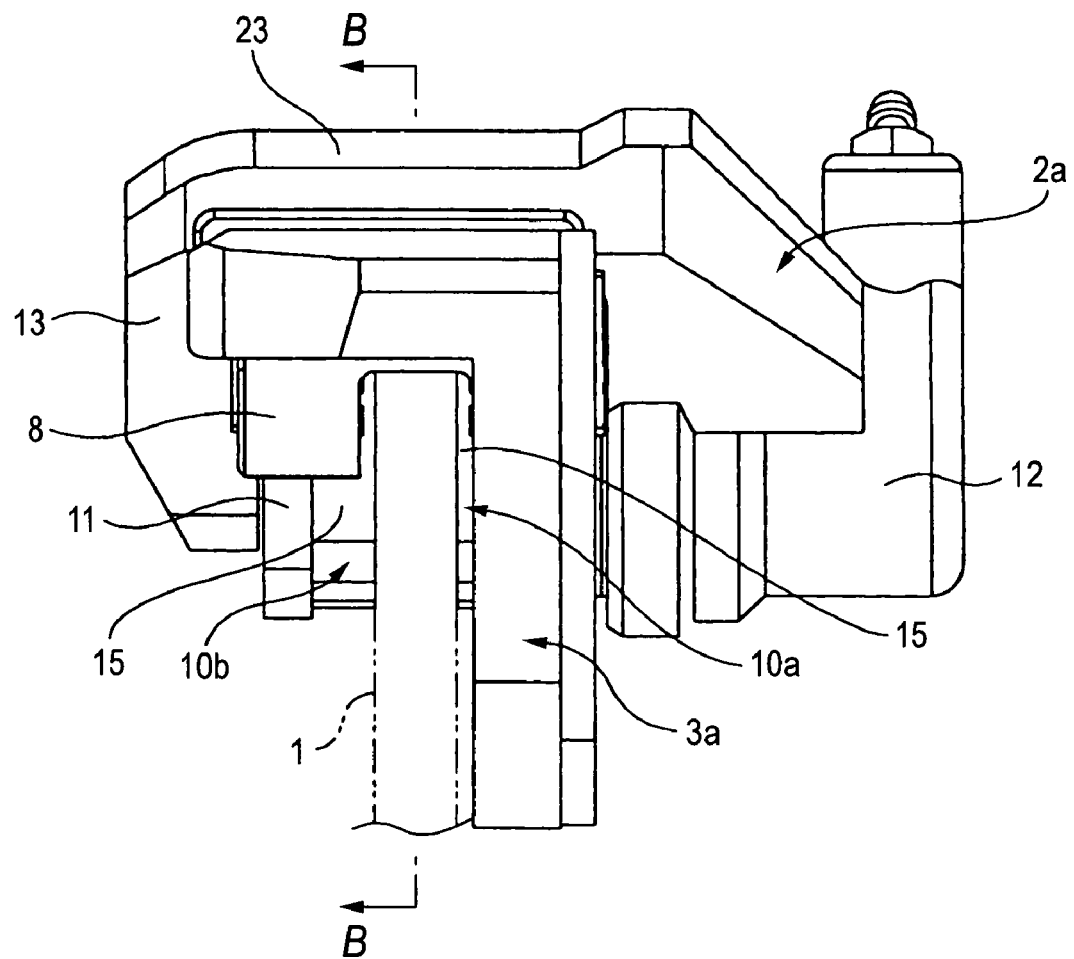
FIG. 7 is a view showing the floating caliper disc brake of FIG. 6 seen from below.
Figure 8:
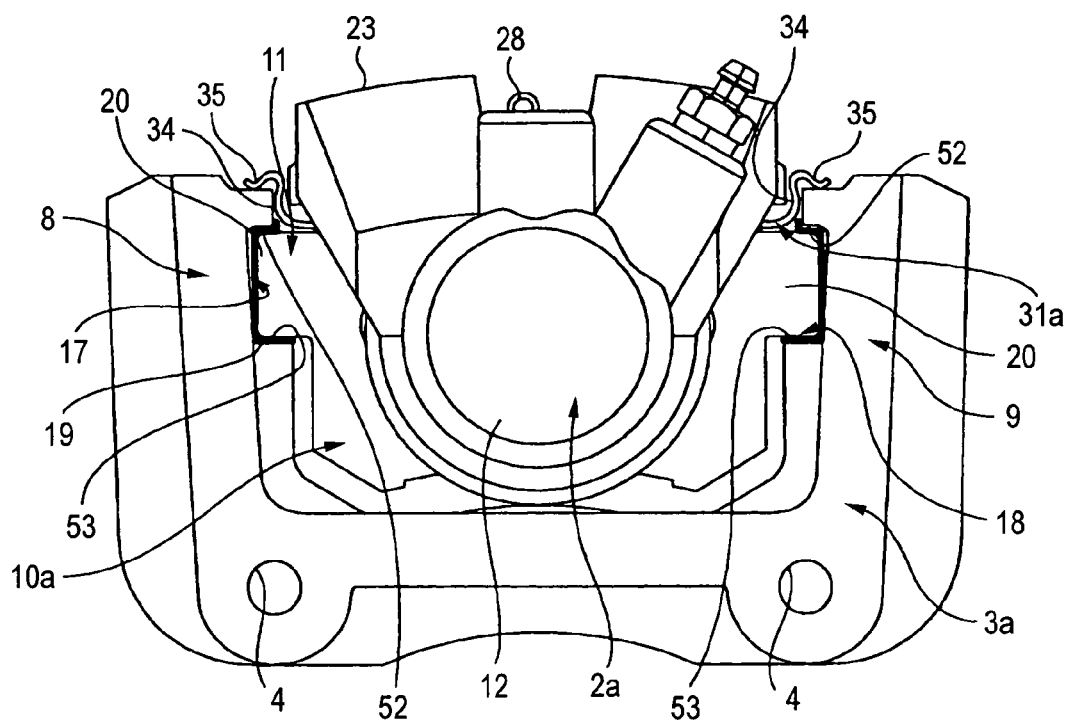
FIG. 8 is a view showing the floating caliper disc brake of FIG. 7 seen from the right.
Figure 9:
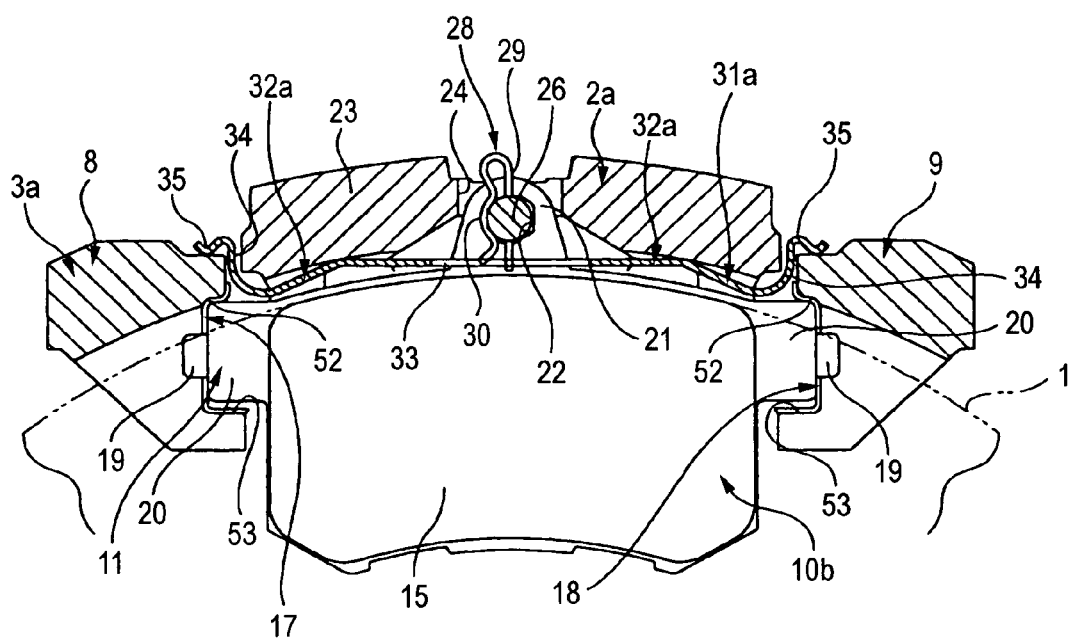
FIG. 9 a sectional view taken along the line B-B in FIG. 7.
Figure 10:
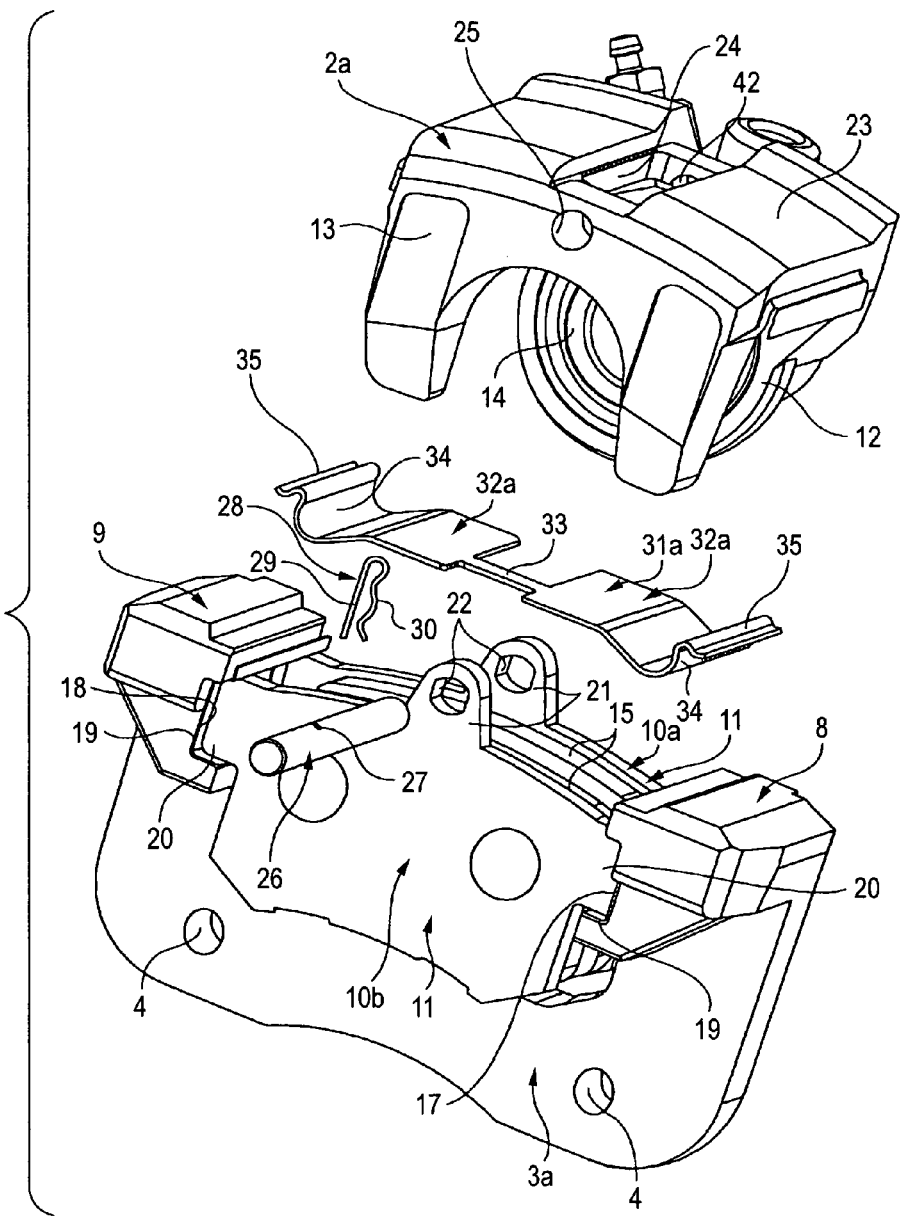
FIG. 10 is an exploded perspective view of the floating caliper disc brake of the second embodiment.
Figure 11:
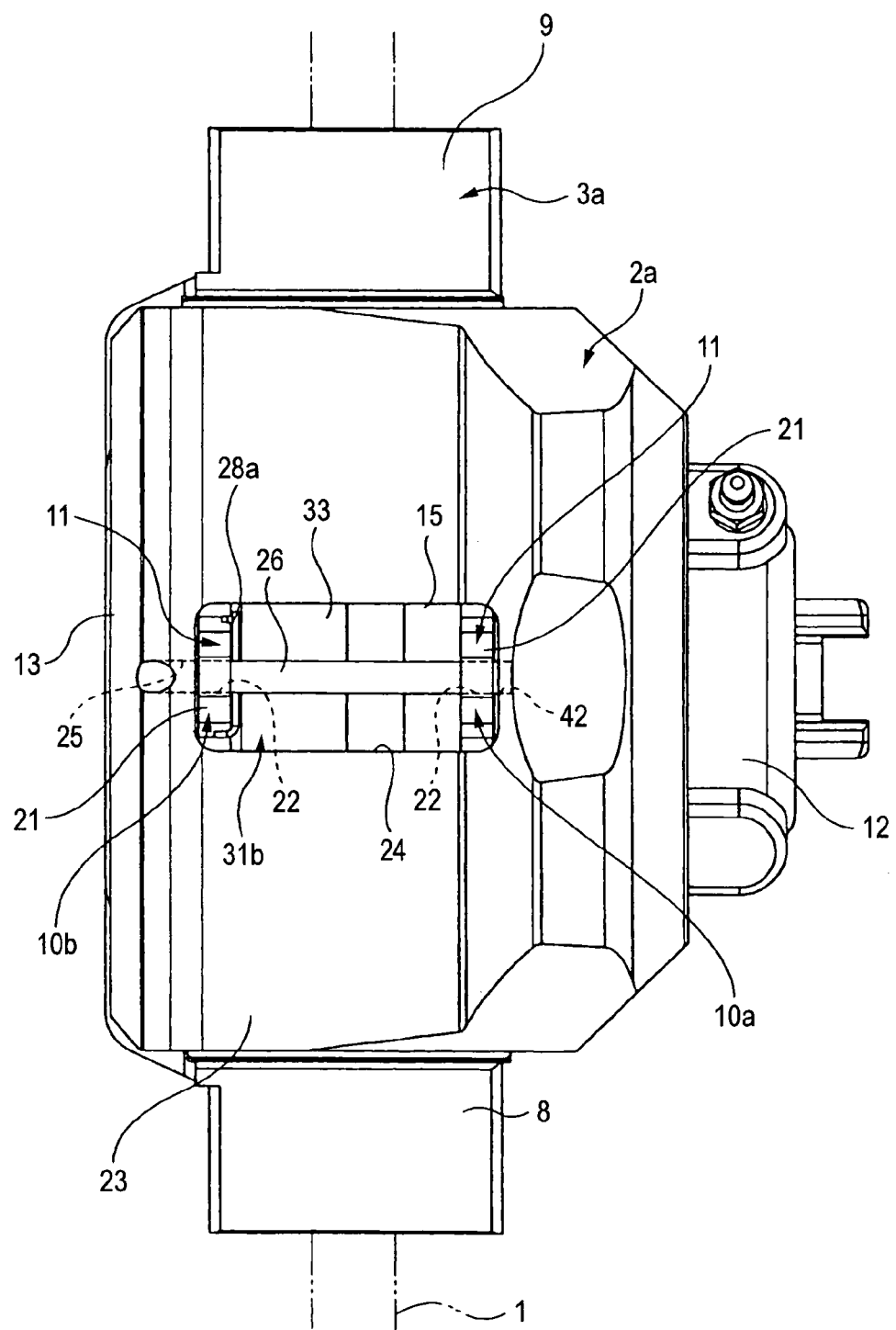
FIG. 11 is a view of a floating caliper disc brake of the third embodiment seen from an outside with respect to a radial direction of a rotor.
Figure 12:
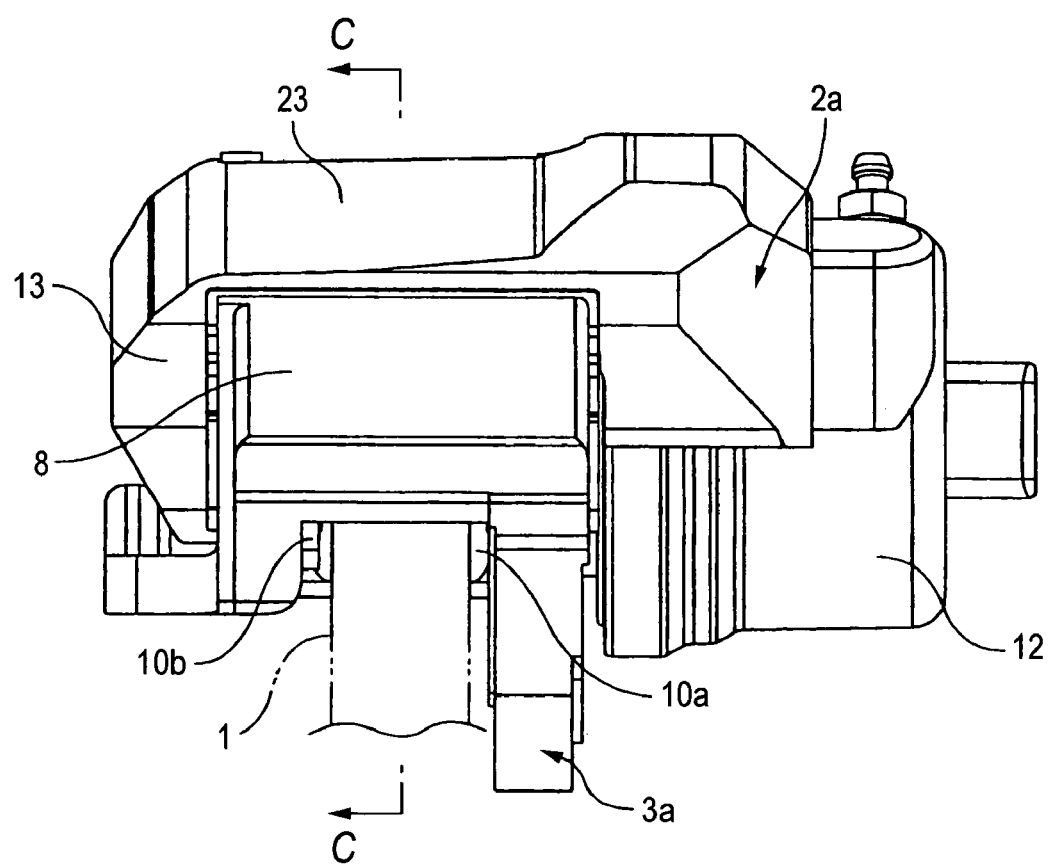
FIG. 12 is a view of the floating caliper disc brake of FIG. 11 seen from below.
Figure 13:
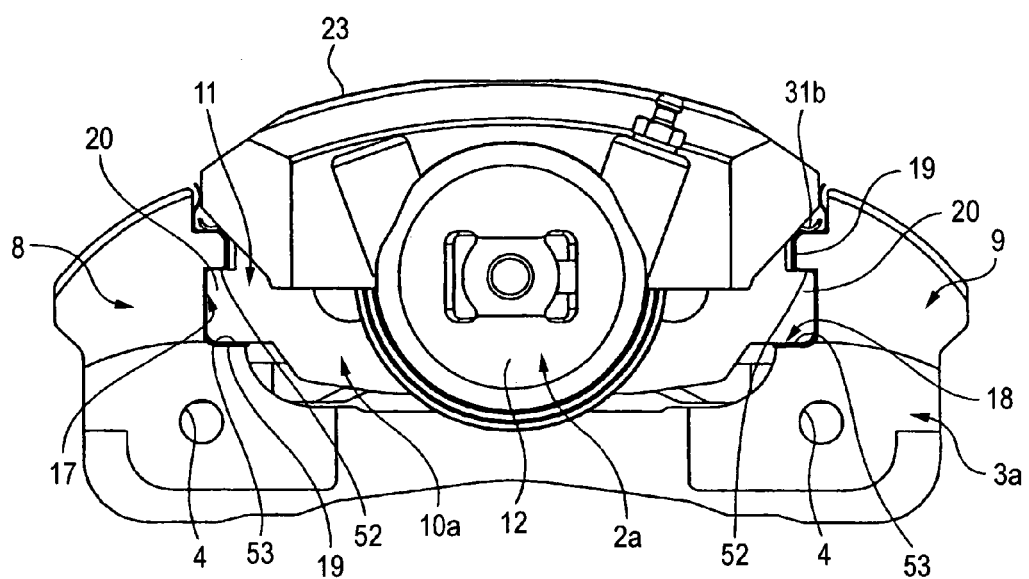
FIG. 13 is a view of the floating caliper disc brake of FIG. 12 seen from the right.
Figure 14:
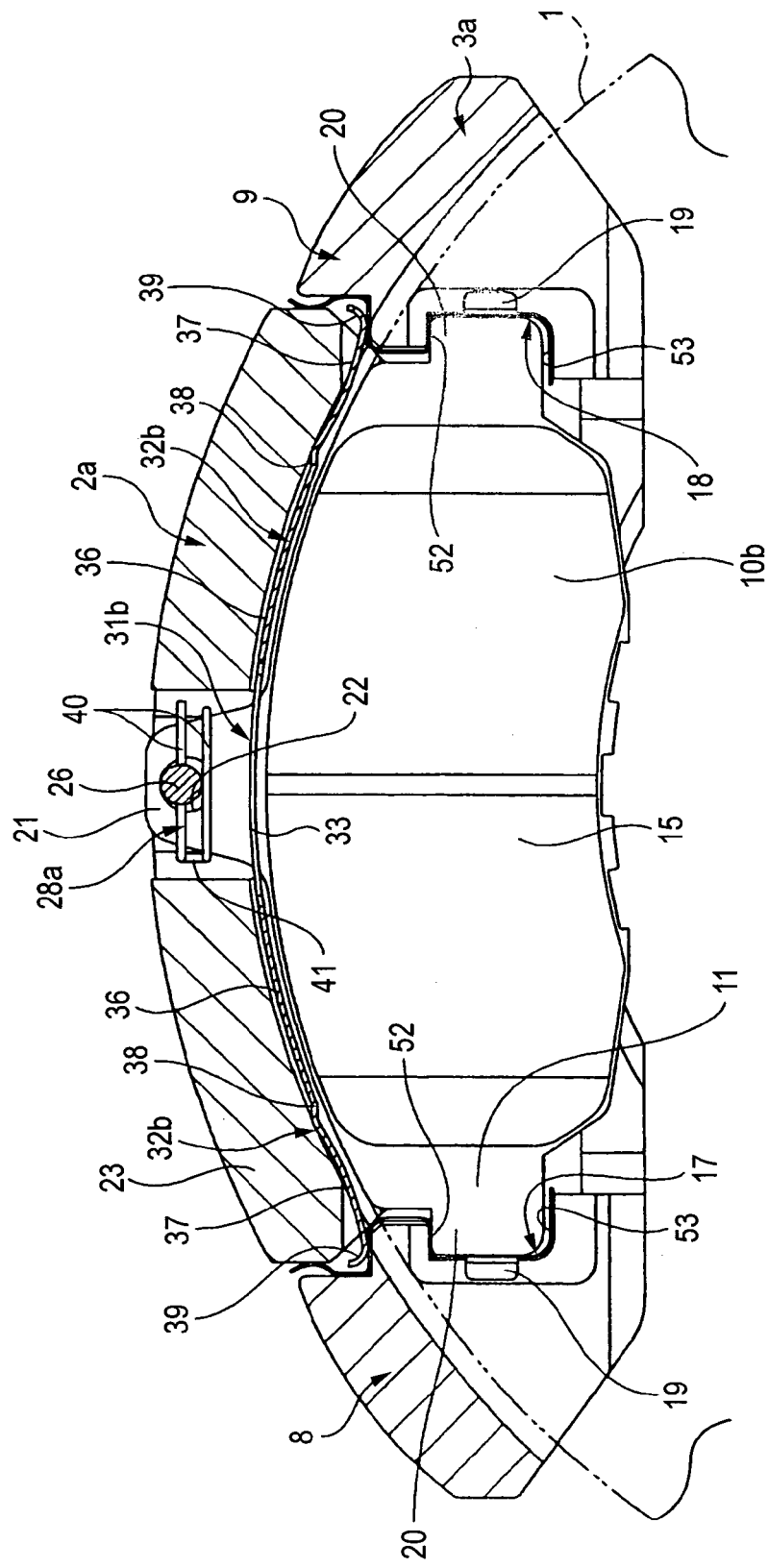
FIG. 14 is a sectional view taken along the line C-C in FIG. 12.

1: rotor; 2, 2a: caliper; 3, 3a, 3b: support; 4: mount hole; 5: guide pin; 6: guide hole; 7: bellows; 8, 8a: rotation input side engagement portion; 9, 9a: rotation output side engagement portion; 10a, 10b: pad; 11: pressure plate; 12: cylinder portion; 13: claw portion; 14: piston; 15: lining; 17: rotation input side recessed portion; 18: rotation output side recessed portion; 19, 19a: pad clip; 20: engagement projection; 21, 21a: projection; 22: guide hole; 23: bridge portion; 24: penetrating hole; 25: through hole; 26: guide pin; 27: through hole; 28, 28a: locking clip; 29: rectilinear portion; 30: wave-formed portion; 31, 31a, 31b, 31c: hold spring; 32, 32a, 32b: pressing piece; 33: connecting portion; 34: entering portion; 35: pressing portion; 36: inward portion; 37: outward portion; 38: stepped portion; 39: pressing portion; 40: leg portion; 41: connecting portion; 42: recessed hole; 43: front fork; 44: notch; 45: anti-rotation pin; 46: wire spring; 47a, 47b: lug portion; 48: bolt; 49: arm portion; 50: throughhole; 51: threaded portion; 52: radially outward side surface; 53: radially inward side surface; 54: inner side mount member; 55: outer side reinforcement member; 56: torque receiving portion; 57: threaded hole; 58: rotation input side arm portion; 59: rotation output side arm portion; 60: threaded hole; 61: anchor portion; 62: connecting portion; 63: through hole; 64: rotation input side arm portion; 65: rotation output side arm portion; 66: reinforcement portion; 67: through hole; 68: stepped portion; 69: bolt; 70: projecting piece; 71: arm portion; 72: locking groove; 73: radially outward side surface; 74: pressing piece; 75: connecting portion; 76: radially inward pressing portion; 77: entering portion; 78: radially outward pressing portion; 79: penetrating hole; 80: projecting piece; 82: bottom plate portion; 83: through; 84: bent piece;. 85: locking member; 86: main body portion; 87: locking arm portion; 88: notch; 89: locking projection; 90: plane portion.

DESCRIPTION OF THE PREFERRED EMBODIMENTS

Embodiments of the invention will be described with reference to the accompanying drawings.

First Embodiment

FIGS. 1 to 5 show a floating caliper disc brake according to a first embodiment of the present invention. A floating caliper disc brake of this embodiment includes a support member 3a, a pair of pads 10a, 10b and a caliper 2. Among them, the support member 3a is fixed to a vehicle body via a pair of mount holes 4, 4 provided at a lower end thereof at a position adjacent to a rotor 1 that rotates together with a corresponding wheel. The caliper 2a has a claw portion 13 provided at one end of a bridge portion 23 which straddles the rotor 1 and the pair of pads 10a, 10b and a cylinder portion 12 provided at the other end of the bridge portion 23 in which a piston 14 is mounted in a snugly-fitting fashion.

In addition, both the pads 10a, 10b are supported on the support member 3a in such a manner as to freely slide in an axial direction (a lateral direction in FIGS. 1, 2, and a direction towards/away from the viewer in FIGS. 3, 4) in such a state that the pads 10a, 10b are disposed at both sides of the rotor 1. Due to this, a pair of engagement portions made up of a rotation input side engagement portion 8 and a rotation output side engagement portion 9, as arm portions, are provided on the support member 3a at positions thereof which are separated apart from each other in a circumferential direction (a vertical direction in FIG. 1, a direction towards/away from the viewer in FIG. 2, and a lateral direction in FIGS. 3, 4) of the rotor 1 so as to be situated at both sides of the support member 3a with respect to a rotational direction of the rotor 1. Distal ends of the respective engagement portions 8, 9 are bent in such a manner as to straddle a circumferential portion of the rotor 1 in the lateral direction of FIGS. 1, 2, and rotation input side and rotation output side recessed portions 17, 18 are formed in internal surfaces of both the engagement portions 8, 9 (sides thereof which face a widthwise central side of the support member 3a) in such a manner as to be recessed in the circumferential direction of the rotor 1 so as to form a shape with a U-shaped cross section. In the case of this embodiment, the respective recessed portions 17, 18 correspond to a recessed groove. Then, a pair of pad clips 19, 19 are mounted in such a manner as to cover internal surfaces of both the recessed portions 17, 18 on the internal surfaces of the rotation input side and rotation output side engagement portions 8, 9, as well as covering a further radially outward portion of the rotor 1 on the internal surfaces of the respective engagement portions 8, 9. The respective pad clips 19, 19 are each such as to be made integrally of a sheet metal having resistance to corrosion and elasticity such as a stainless steel, so that no looseness of the pads 10a, 10b is produced relative to the support member 3a when no brakes are applied. The respective pad clips 19, 19 also have a function to prevent the corrosion of sliding portions between pressure plates 11, 11 which constitute the pads 10a, 10b, respectively, and the support member 3a. Then, engagement projections 20, 20 which are provided at both end portions of the respective pressure plates 11, 11 in the circumferential direction of the rotor 1 are brought into engagement with the rotation input side and rotation output side recessed portions 17, 18, respectively, in such a manner as to be allowed to move in the axial direction of the rotor 1. In this configuration, the respective pads 10a, 10b are guided by the support member 3a in such a manner as to move in the axial direction of the rotor 1.

In addition, the caliper 2a disposes a bridge portion 23 thereof between both the rotation input side and rotation output side engagement portions 8, 9 so as to be kept from moving with respect to the circumferential direction of the rotor 1. Furthermore, the caliper 2a is supported on the respective pads 10a, 10b in such a manner as to be brought into engagement with and disengagement from the support member 3a while being allowed to move in the axial direction of the rotor 1 with respect to the respective pads 10a, 10b. Due to this, projections 21, 21 are formed, respectively, at widthwise (vertically in the FIG. 1, in the direction toward/away from the viewer in FIG. 2, and laterally in FIGS. 3 to 5) central portions of the pressure plates 11, 11 which constitute the pads 10a, 10b, respectively, in such a manner as to project radially outwards of the rotor 1. Then, guide holes 22, 22 (FIGS. 1, 4, 5) are formed in the projections 21, 21 so as to penetrate therethrough in the axial direction of the rotor 1 in such a manner as to be one in each guide hole. In addition, a penetrating hole 24 is formed in the bridge portion 23 that is part of the caliper 2a and which connects the claw portion 13 and the cylinder portion 12 together at a widthwise central portion thereof as an opening which penetrates through the bridge portion 23 of the caliper 2a in the radial direction of the rotor 1. Then, a through hole 25 which penetrates through the bridge portion 23 in the axial direction of the rotor 1 and a bottomed recessed hole 42 are formed in the bridge portion 23 at a claw portion 13 side and a cylinder portion 12 side thereof with the penetrating hole 24 held therebetween coaxially with each other. In the case of this embodiment, the through hole 25 and the bottomed recessed hole 42 correspond to hole portions. In addition, the piston 14 is snugly fittingly mounted in the cylinder portion 12 in a fluid-tight fashion. Then, end portions of a metallic guide pin 26 are passed through and inserted in the through hole 25 and the recessed hole 42, respectively, and two locations of the guide pin 26 which are spaced apart from each other in a longitudinal direction of the guide pin 26 are fitted in (passed through) the guide holes 22, 22, which are through holes formed in the respective pads 10a, 10b, in such a manner as to be capable of sliding in the axial direction of the rotor 1.

Figure 21:
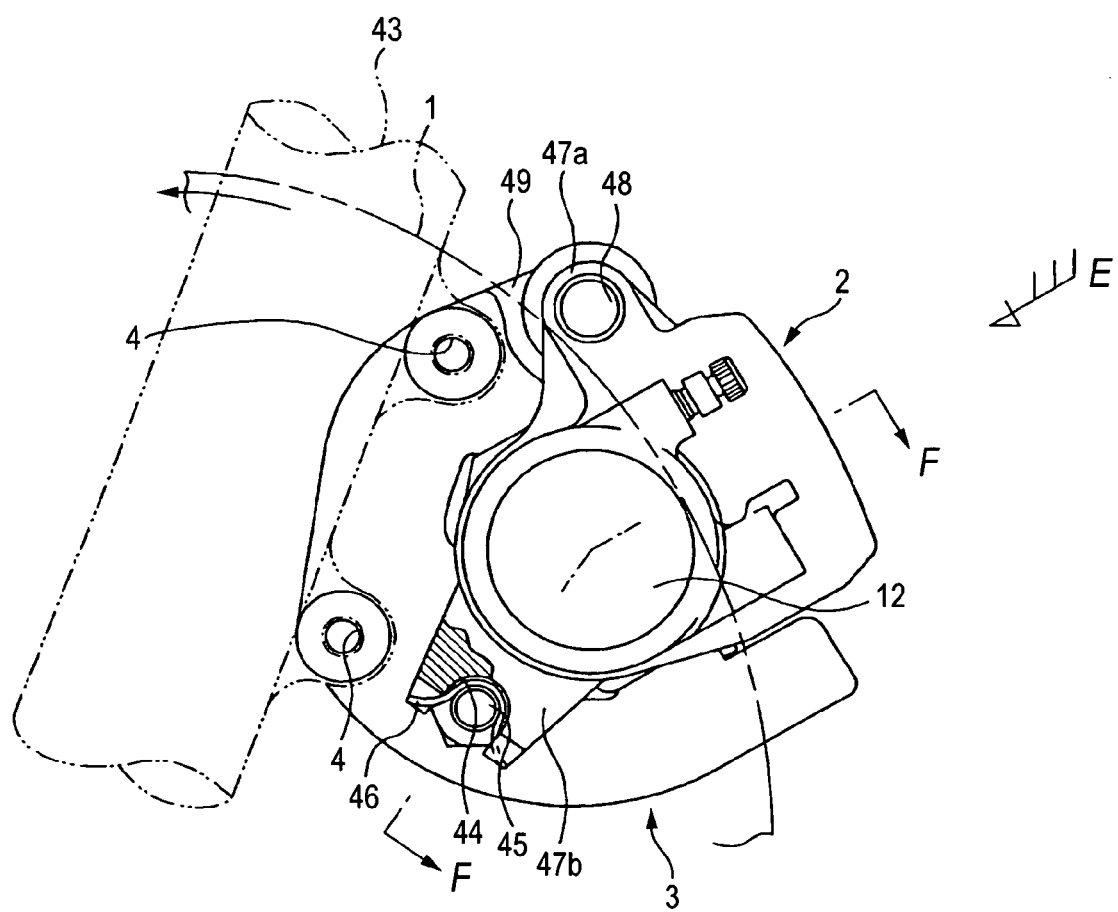
FIG. 21 is a partially cutaway view showing an example of the related-art.
Figure 22:
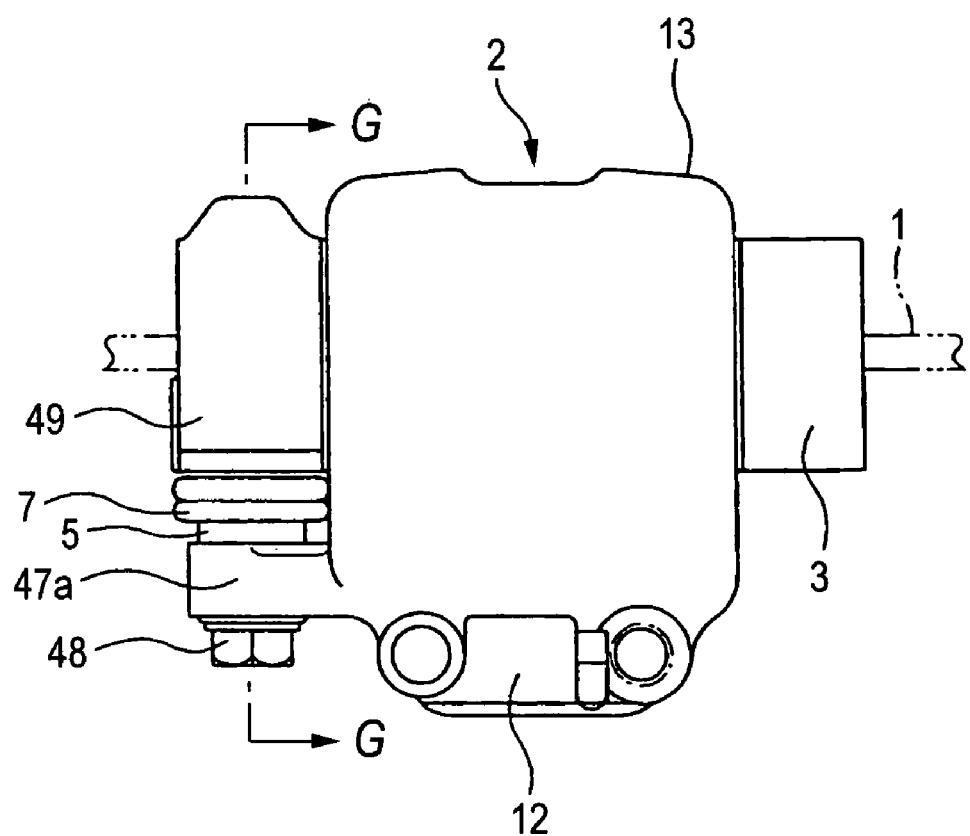
FIG. 22 is a view as seen in a direction indicated by an arrow W in FIG. 21.
Figure 23:
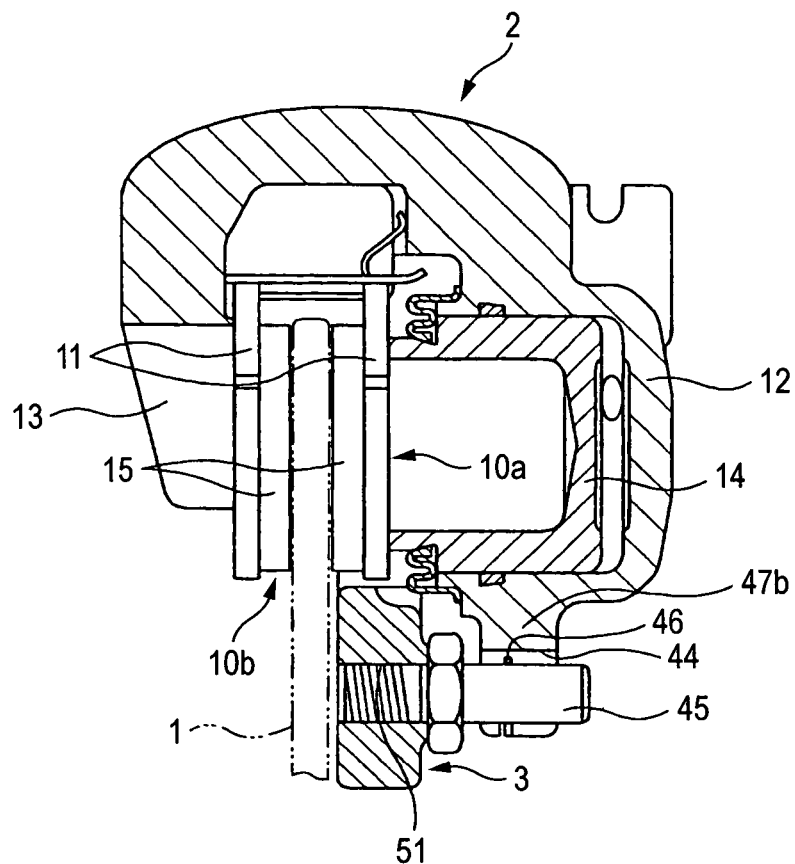
FIG. 23 is a sectional view taken along the line F-F in FIG. 21.
Figure 24:
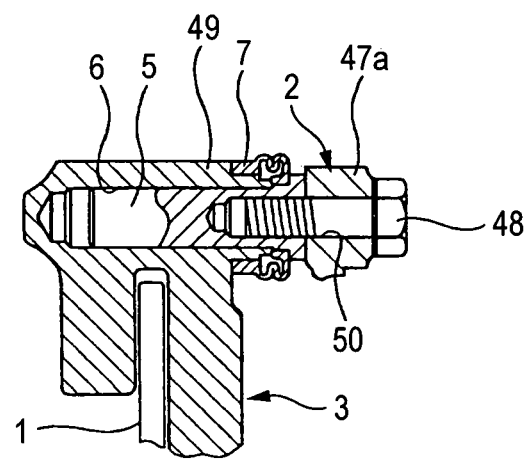
FIG. 24 is a sectional view taken along the line G-G in FIG. 22.

In addition, a clipping clip 28 is locked at a longitudinally central portion of the guide pin 26 which is situated at a portion between the guide holes 22 formed in the pads 10a, 10b, respectively. As is shown in detail in FIG. 5, the locking clip 28 is such as to be bent into a U-shaped form on the whole, and one side of the locking clip 28 so bent is formed into a rectilinear portion 29, whereas the other side thereof is formed into a wave-formed portion 30. Of the locking clip 28 which is formed in a manner described above, the rectilinear portion 29 is passed through a through hole 27 (FIG. 5) that is formed in a longitudinally central portion of the guide pin 26 in such a manner as to penetrate through the pin in a radial direction-thereof, and a portion of the wave-formed portion 30 which is curved in an arc-like fashion along an outer circumferential surface of the guide pin 26 is elastically pressed against the outer circumferential surface of the guide pin 26. In this configuration, the locking clip 28 is prevented from being abruptly dislodged from the interior of the through hole 27 in the guide pin 26. Then, the guide pin 26 and the caliper 2a are made incapable of being separated apart from each other by the locking clip 28. Namely, the displacement of the guide pin 26 to an inner side (a right side in FIGS. 1, 2 and a side farther away from the viewer in FIG. 5) relative to the caliper 2a is prevented by virtue of the impingement of an inner side end portion of the guide pin 26 on a bottom portion of the recessed hole 42 formed in the caliper 2a. In addition, the displacement of the guide pin 26 to an outer side (a left side in FIGS. 1, 2 and a side toward the viewer in FIG. 5) relative to the caliper 2a is prevented by virtue of the impingement of the locking clip 28 on an internal surface of the pressure plate 11 of the outer side pad 10b. Due to this, the guide pin 26 is made incapable of being separated apart from the caliper 2a by the locking clip 28. In the case of the embodiment that is configured as has been described above, a bolt 48 (refer to FIGS. 21, 22, 24) does not have to be connected to the guide pin 26 in order for the caliper 2a to be supported on the guide pin 26, and hence the configuration of the guide pin 26 becomes simple.

In the case of the embodiment, as has been described above, by passing the guide pin 26 through the respective guide holes 22, 22 in such a manner as to be permitted to slide in the axial direction, the caliper 2a is supported in such a manner as to be capable of being displaced in the axial direction of the rotor 1 relative to the respective pads 10a, 10b. In addition, in the case of the embodiment, a supporting means is made up of the through hole 25 and the recessed hole 42 which are formed in the caliper 2a and the guide pin 26 that is fitted in the through hole 25 and the recessed hole 42 and which is passed through the guide holes 22, 22 provided in the pressure plates 11, 11 of the respective pads 10a, 10b.

Furthermore, in the case of the embodiment, a hold spring 31 which is an elastic material is provided between outer circumferential edges of the pressure plates 11, 11, which make up the pads 10a, 10b, respectively, and a portion on an internal surface of the caliper 2a which faces the pressure plates 11, 11 and an outer circumferential edge of the rotor in the radial direction. The hold spring 31 is such that a sheet metal having a relatively large rigidity is formed into a shape as shown in detail in FIGS. 4, 5 and includes a pair of pressing pieces 32, 32 provided at both ends thereof in the circumferential direction of the rotor 1 and a flat plate-like connecting portion 33 which is narrow in width and is adapted to connect together edges of longitudinal end portions of the pressing pieces 32, 32. The respective pressing pieces 32, 32 are each formed into a shape with a substantially V-shaped cross section by being bent toward the respective pads 10a, 10b at longitudinally intermediate portions thereof. In the hold spring 31 that is configured as has been described above, the other longitudinal end portions of the respective pressing pieces 32, 32 are elastically pressed against radially outward side surfaces 52, 52 of the respective rotation input side and rotation output side recessed portions 17, 18 which are situated at outward ends thereof with respect to the radial direction of the rotor 1 via the pad covers 19, 19 in such a state that the connecting portion 33 is disposed between the projections 21, 21 of the pressure plates 11, 11 which make up the pads 10a, 10b, respectively. In addition, longitudinally intermediate portions of the respective pressing pieces 32, 32 are elastically pressed against the outer circumferential edges of the pressure plates 11, 11 which make up the pads 10a, 10b, respectively. Furthermore, the longitudinal end portions of the respective pressing pieces 32, 32 are elastically pressed against portions of the internal surface of the caliper 2a which correspond to the periphery of the opening of the penetrating hole 24. In this configuration, the engagement projections 20, 20 provided at the end portions of the pressure plates 11, 11 which constitute the pads 10a, 10b, respectively, are elastically pressed against radially inward side surfaces 53, 53 on the internal surfaces of the rotation input side and rotation output side recessed portions 17, 18 of the support member 3a which are situated at inward ends thereof with respect to the radial direction of the rotor 1 via the pad clips 19, 19 by the hold spring 31. Namely, portions of the hold spring 31 which are situated closer to the ends thereof extend elastically between the radially outward side surfaces 52, 52 of the respective rotation input side and rotation output side recessed portions 17, 18 and the outer circumferential edges of the respective pressure plates 11, 11 so as to elastically press the respective engagement projections 20, 20 against the radially inward side surfaces 53, 53 of the respective recessed portions 17, 18. Then, respective pads 10a, 10b are supported on the support member 3a in such a manner as to be capable of sliding in the axial direction of the rotor 1 while being kept from being displaced in the radial direction of the rotor as has been described just above. Note that a minute gap exists in the circumferential direction of the rotor 1 between end surfaces of the caliper 2a in the width direction thereof and the pad clips 19, 19 mounted on the support member 3a, respectively.

The floating caliper disc brake that is configured as has been described heretofore will be installed as follows. First of all, the pad clips 19, 19 are mounted, respectively, in the rotation input side and rotation output side recessed portions 17, 18 which are provided on the support member 3a. Then, the respective pads 10a, 10b are installed in the support member 3a in such a state that the respective engagement projections 20, 20 provided at the end portions of the pressure plates 11, 11 which constitute the respective pads 10a, 10b in the recessed portions 17, 18, respectively. Next, the hold spring 31 is placed on radially outward sides of the respective pads 10a, 10b in such a state that the end portions of the hold spring 31 are inserted between the radially outward side surfaces 52, 52 of the respective recessed portions 17, 18 and outer circumferential edges of the respective engagement projections 20, 20, respectively. Next, the caliper 2a is disposed in such a manner as to be held by the respective pads 10a, 10b while pressing the respective pressing pieces 32, 32 of the hold spring 31 by the internal surface of the caliper.

In addition, the guide holes 22, 22 which are provided, respectively, in the pressure plates 11, 11 which constitute the pads 10a, 10b, respectively, and the through hole 25 and the recessed hole 42 which are provided in the caliper 2a are positioned coaxially. Then, in this state, the guide pin 26 is passed through the respective guide holes 22, 22, and the through hole 25 and the recessed hole 42, and the locking clip 28 is inserted in the through hole 27 in the guide pin 26 so that the locking clip 28 is locked on the guide pin 26. The guide pin 26 is made incapable of being separated apart from the caliper 2a in such a state that the locking clip 28 is locked on the guide pin 26. Thus, the floating caliper disc brake is installed in the manner described above.

In the case of the floating caliper disc brake of the embodiment-that is configured as has been described before and installed as is described above, the respective pads 10a, 10b are pressed against both the sides of the rotor 1 in a manner that will be described below. First of all, when an oil is fed under pressure into the interior of the cylinder portion 12 at the time of application of the brakes, the piston 14, which is snugly fittingly mounted in the cylinder portion 12 in a fluid-tight fashion, presses the lining 15 of the inner side pad 10a against the internal surface of the rotor 1. Then, the caliper 2a is displaced inner side as a reaction of the pressing force so applied to the lining 15, and the claw portion 13 then presses the lining 15 of the outer side pad 10b against an external side of the rotor 1. As this occurs, the caliper 2a supported on the guide pin 26 is displaced in the axial direction of the rotor 1 by virtue of the slide of the guide holes 22 provided in the respective pads 10a, 10b on the guide pin 26.

In addition, in the case of the floating caliper disc brake of the embodiment, the caliper 2a is disposed between the rotation input side and rotation output side engagement portions 8, 9 that are provided on the support member 3a in such a manner as to be separated apart from each other in the circumferential direction of the rotor 1. Due to this, the movement of the caliper 2a in the circumferential direction of the rotor 1 can be restricted, and the prevention of rotation of the caliper 2a (the prevention of rotation of the caliper 2a about the single guide pin 26) can also be realized. Moreover, in the case of the invention, being from different from the related-art construction that is illustrated in FIGS. 21 to 24, the necessity is obviated of connecting the anti-rotation pin 45 (refer to FIGS. 21, 23) that realizes the prevention of rotation of the caliper 2a to the support member 3a. In addition, the necessity is also obviated of forming the U-shaped notch 44 (refer to FIGS. 21, 23) inthe caliper 2a for engagement with the anti-rotation pin 45, thereby making it possible to manufacture the caliper 2a at low costs.

In addition, as in the case with the embodiment, when the center axes of the guide pin 26, the guide holes 22, 22 in which the guide pin 26 is fitted, the through hole 25 and the recessed hole 42 are positioned on an imaginary plane that includes both central axes of the rotor 1 and the piston 14, the deviation of the caliper 2a that occurs when the piston 14 is pushed out for application of the brakes is reduced and hence the linings 15, 15 of the respective pads 10a, 10b are made easy to be evenly pressed against both the sides of the rotor 1. Due to this, the occurrence of uneven wear of the respective pads 10a, 10b can be suppressed. In addition, when a non-corrodible material is used for the members making up the supporting means such as the guide pin 26, the improvement in resistance to corrosion can be realized.

In addition, in the case of the embodiment, the guide pin 26 is made incapable of being separated apart from the caliper 2a by means of the locking clip 28. Due to this, the construction can be obtained at low costs in which the caliper 2a is supported in such a manner as to freely be displaced in the axial direction of the rotor 1 relative to the respective pads 10a, 10b.

Additionally, in the case of the embodiment, an elastic force is imparted to the respective pads 10a, 10b in a direction in which the pads 10a, 10b are moved away from the rotational center of the rotor 1 by means of the hold spring 31 provided between the respective pads 10a, 10b and the support member 3a. In addition, the rotation input side and rotation output side recessed portions 17, 18 are provided at both the end portions of the support member 3a in the rotational direction of the rotor 1, and the end portions of the respective pads 10a, 10b are elastically pressed against the radially inward side surfaces 53, 53 of the respective recessed portions 17, 18 by means of the hold spring 31 to thereby restrict the displacement of the respective pads 10a, 10b with respect to the radial direction of the rotor 1. Due to this, the looseness of the caliper 2a and the respective pads 10a, 10b can be suppressed by the hold spring 31.

Second Embodiment

FIGS. 6 to 10 show a floating caliper disc brake according to a second embodiment of the present invention. In the case of this embodiment, a caliper 2a is supported in such a manner as to freely be displaced in an axial direction of a rotor 1 (a lateral direction in FIGS. 6, 7 and a direction toward/away from the viewer in FIGS. 8, 9) relative to a support member 3a, and the caliper 2a is supported in such a manner as to freely be displaced in the axial direction of the rotor relative to respective pads 10a, 10b. Due to this, in the case of the embodiment, an elastic force is imparted to the caliper 2a in a direction in which the caliper 2a moves away from the rotor 1 by means of a hold spring 31a provided between the caliper 2a and the support member 3a. Namely, this hold spring 31a has a configuration illustrated in detail in FIGS. 9, 10, and longitudinally intermediate portions of a pair of pressing pieces 32a, 32a provided at both ends of the hold spring 31a are each bent into a shape with a substantially V-shaped cross section. Then, portions of the respective pressing pieces 32a, 32a which are close to ends thereof which constitute ends of the hold spring 31a are bent in a radially outward direction of the rotor 1, whereby entering portions 34, 34 are provided which are made to freely enter between end faces of the caliper 2a in a width direction thereof and internal surfaces of rotation input side and rotation output side engagement portions 8, 9 of the support member 3a, respectively. Then, pressing portions 35, 35 which are each bent into a waveform are provided at portions of end portions of the respective entering portions 34, 34 which project radially outward of the rotor 1 from the in-between portions in such a manner as to freely come to strike external surfaces of the respective engagement portions 8, 9. In addition, the hold spring 31a elastically presses the longitudinally intermediate portions of the respective pressing pieces 32a, 32a against two locations on an internal surface of the caliper 2a which are separated apart from each other in a circumferential direction of the rotor 1 and also elastically presses the respective pressing portions 35, 35 against the external surfaces of the respective engagement portions 8, 9. In this configuration, an elastic force is imparted by the hold spring 31a to the caliper 2a and the respective pads 10a, 10b which are supported relative to the caliper 2a via a guide pin 26 in a direction in which the caliper 2a and the pads 10a, 10b are moved away from the rotor 1. Note that the pressing pieces 32a, 32a of the hold spring 31a are not in contact with outer circumferential edges of pressure plates 11, 11 which constitute the pads 10a, 10b, respectively. In addition, the entering portions 34, 34 and the pressing portions 35, 35 of the respective pressing pieces 32a, 32a are spaced apart from both side surfaces of the caliper 2a in the width direction thereof.

Thus, in the case of the embodiment, the elastic force is imparted to the caliper 2a and the respective pads 10a, 10b in the direction in which the caliper and the pads are moved away from the rotor 1. Due to this, engagement projections 20, 20 provided at both end portions of the pressure plates 11, 11 which make-up the respective pads 10a, 10b are put in a state where the engagement projections 20, 20 are elastically pressed against radially outward side surfaces 52, 52 on the internal surfaces of the rotation input side and rotation output side recessed portions 17, 18 provided in the respective engagement portions 8, 9 which are situated at external ends with respect to the radial direction of the rotor 1. Then, the respective pads 10a, 10b are made to freely slide in the axial direction of the rotor 1 relative to the support member 3a in such a state that the respective pads 10a, 10b are kept from being displaced with respect to the radial direction of the rotor 1. Note that gaps in the radial direction of the rotor 1 exist between radially inward side surfaces 53, 53 of the engagement projections 20, 20 which are situated at inward ends thereof with respect to the radial direction of the rotor 1 and the internal surfaces of the respective recessed portions 17, 18.

In the case of the embodiment that is configured as has been described just above, the caliper 2a is supported in such a manner as to freely be displaced in the axial direction of the rotor 1 relative to the support member 3a, and the caliper 2a is supported in such a manner as to freely be displaced in the axial direction of the rotor 1 relative to the respective pads 10a, 10b. Also in the case of the embodiment that is configured as has been described above, the caliper 2a is disposed between the rotation input side and rotation output side engagement portions 8, 9 which are provided on the support member 3a in such a manner as to be spaced apart from each other in the circumferential direction of the rotor 1. Due to this, the movement of the caliper 2a in the circumferential direction of the rotor 1 can be restricted, and the prevention of rotation of the caliper 2a can be realized. Moreover, being different from the related-art construction illustrated in FIGS. 21 to 24, the necessity is obviated of connecting the anti-rotation pin 45 (refer to FIGS. 21, 23) that realizes the prevention of rotation of the caliper 2a to the support member 3a and forming the U-shaped notch 44 (refer to FIGS. 21, 23) in the caliper 2a for engagement with the anti-rotation pin 45, thereby making it possible to facilitate the realization of reduction in overall production costs of the disc brake. Moreover, the effect of configuration accuracy of the guide holes 22, 22 on the displacement accuracy of the caliper can be reduced. Due to this, when applying the brakes, the caliper 2a can be made to easily be displaced to a desired state with good accuracy.

In addition, in the case of the embodiment, the elastic force is imparted to the caliper 2a and the respective pads 10a, 10b by the hold spring 31a provided between the caliper 2a and the support member 3a in the direction in which the caliper and the pads are moved away from the rotational center of the rotor 1. Furthermore, the rotation input side and rotation output side engagement portions 17, 18 are provided at both the end portions of the support member 3a in the rotational direction of the rotor 1, and the end portions of the respective pads 10a, 10b are elastically pressed against the radially outward side surfaces 52, 52 on the internal surfaces of the respective recessed portions 17, 18 which are situated at the external ends thereof with respect to the radial direction of the rotor 1. Due to this, the looseness of the caliper and the respective pads 10a, 10b can be suppressed by means of the hold spring 31a.

Since the other configurations and function of the second embodiment are similar to those of the first embodiment, like reference numerals are imparted to like constituent components or members to those of the first embodiment, and repeated descriptions thereof will be omitted herein.

Third Embodiment

FIGS. 11 to 15 show a floating caliper disc brake according to a third embodiment of the present invention. In the case of this embodiment, being different from the second embodiment that is illustrated in FIGS. 6 to 10, no entering portion 34 (refer to FIGS. 8 to 10) is provided at both end portions of a hold spring 31b which is adapted to enter between end faces of a caliper 2a in the width direction thereof and internal surfaces of respective rotation input side and rotation output side engagement portions 8, 9. Namely, in the case of the embodiment, as is illustrated in detail in FIGS. 14, 15, in a pair of pressing pieces 32b, 32b which make up the hold spring 31b, inward portions 36, 36 which are provided toward a longitudinal center of the hold spring 31b and outward portions 37, 37 which are provided toward longitudinal ends of the hold spring 31b are connected to stepped portions 38, 38. The inward portions 36, 36 are positioned further inward with respect to the radial direction of a rotor 1 than the outward portions 37, 37. Then, portions of the outward portions 37, 37 which are situated toward the inward portions 36, 36 are elastically pressed against an internal surface of the caliper 2a. In addition, the respective inward portions 36, 36 are spaced apart from the internal surface of the caliper 2a. Furthermore, pressing portions 39, 39, which are each curbed into a shape with an arc-like cross section, are provided at portions of the respective outward portions 37, 37 which are situated toward the longitudinal ends of the hold spring 31, respectively, and the respective pressing portions 39, 39 are elastically pressed against side surfaces on the external surfaces of the respective rotation input side and rotation output side engagement portions 8, 9 which face the internal surface of the caliper 2a via pad clips 19, 19. In this configuration, an elastic force is imparted to the caliper 2a and the respective pads 10a, 10b by the hold spring 31b in a direction in which the caliper and the pads are moved away from the rotational center of the rotor 1. In addition, engagement projections 20, 20 which are provided on both end portions of the pressure plates 11, 11 which constitute the respective pads 10a, 10b are elastically pressed against outward side surfaces 52, 52 on internal surfaces of rotation input side and rotation output side recessed portions 17, 18 which are situated at external ends with respect to the radial direction of the rotor 1.

Figure 15:
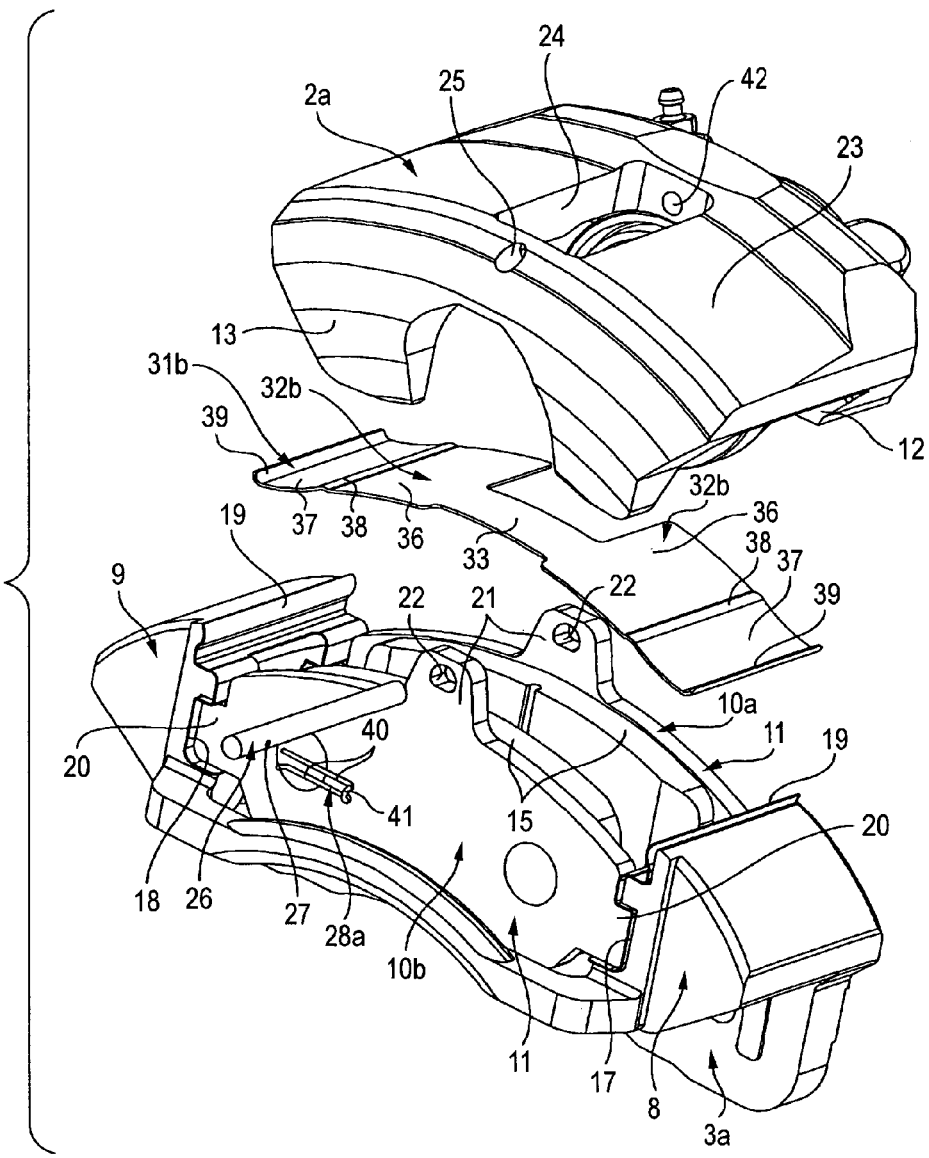
FIG. 15 is an exploded perspective view of the third embodiment.
Figure 16:
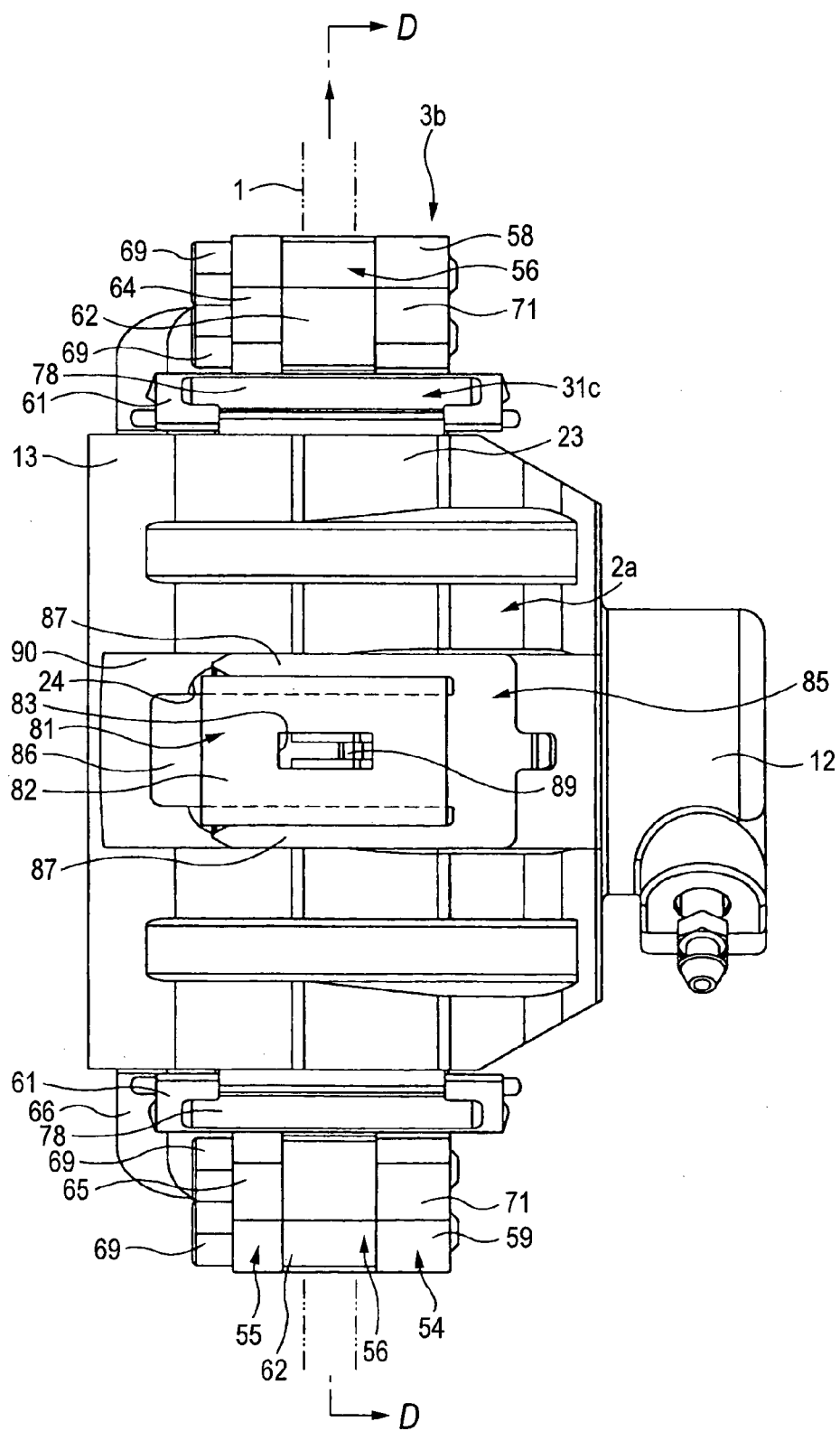
FIG. 16 a view of a floating caliper disc brake of a fourth embodiment seen from an outside with respect to a radial direction of a rotor.
Figure 17:
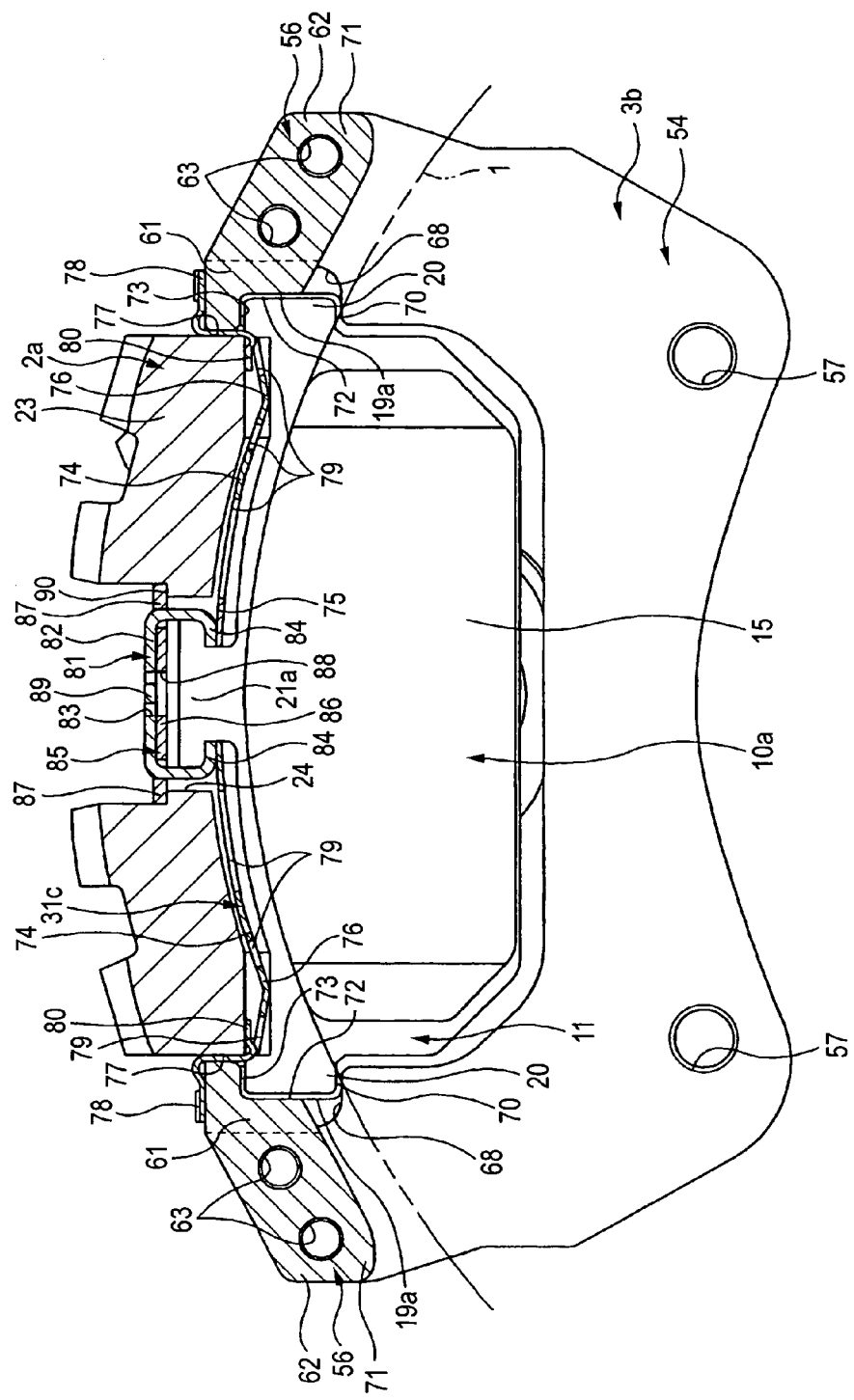
FIG. 17 is a sectional view taken along the line D-D in FIG. 16.
Figure 18:
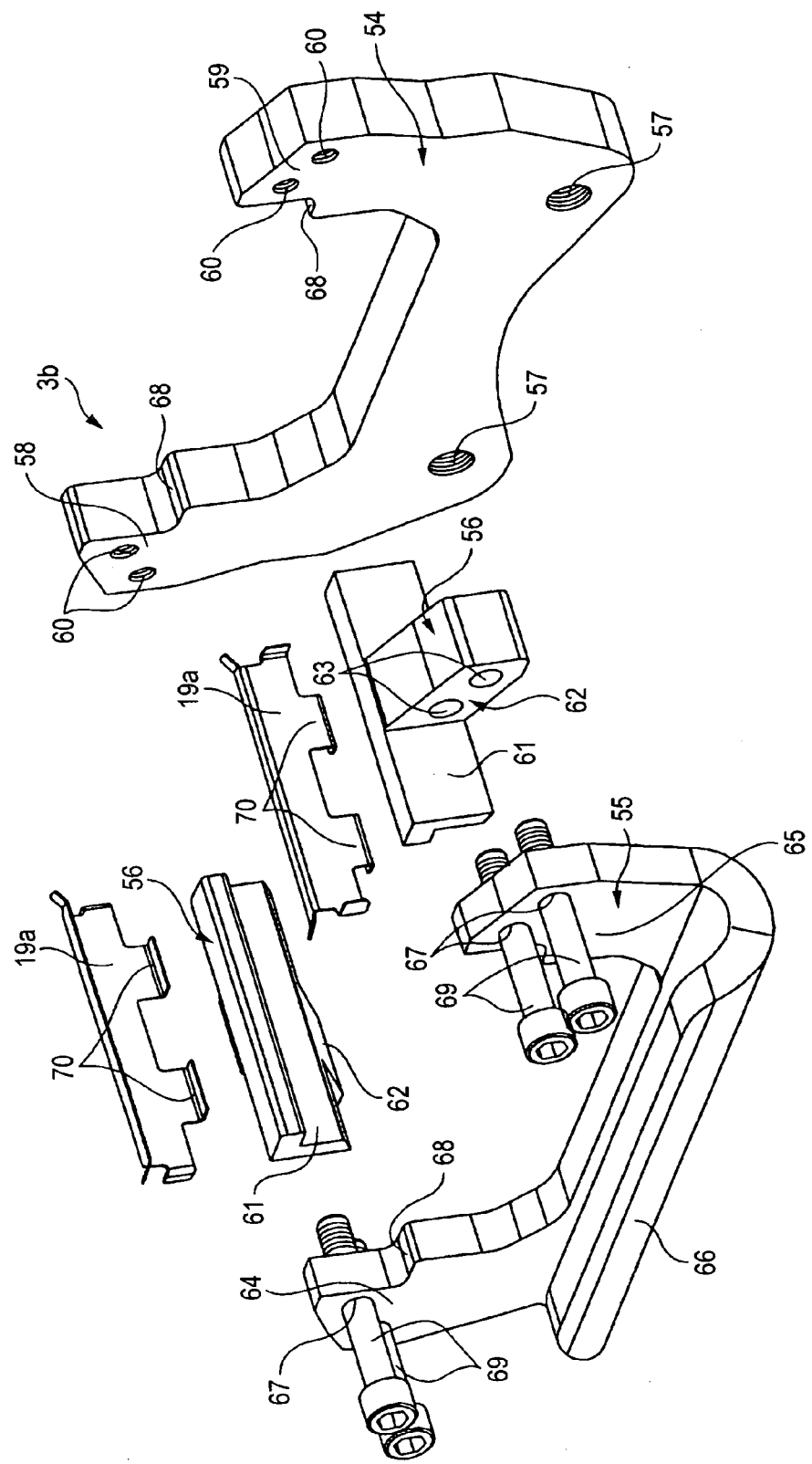
FIG. 18 is an exploded perspective view of a support member which constitutes the floating caliper disc brake of the fourth embodiment.
Figure 19:
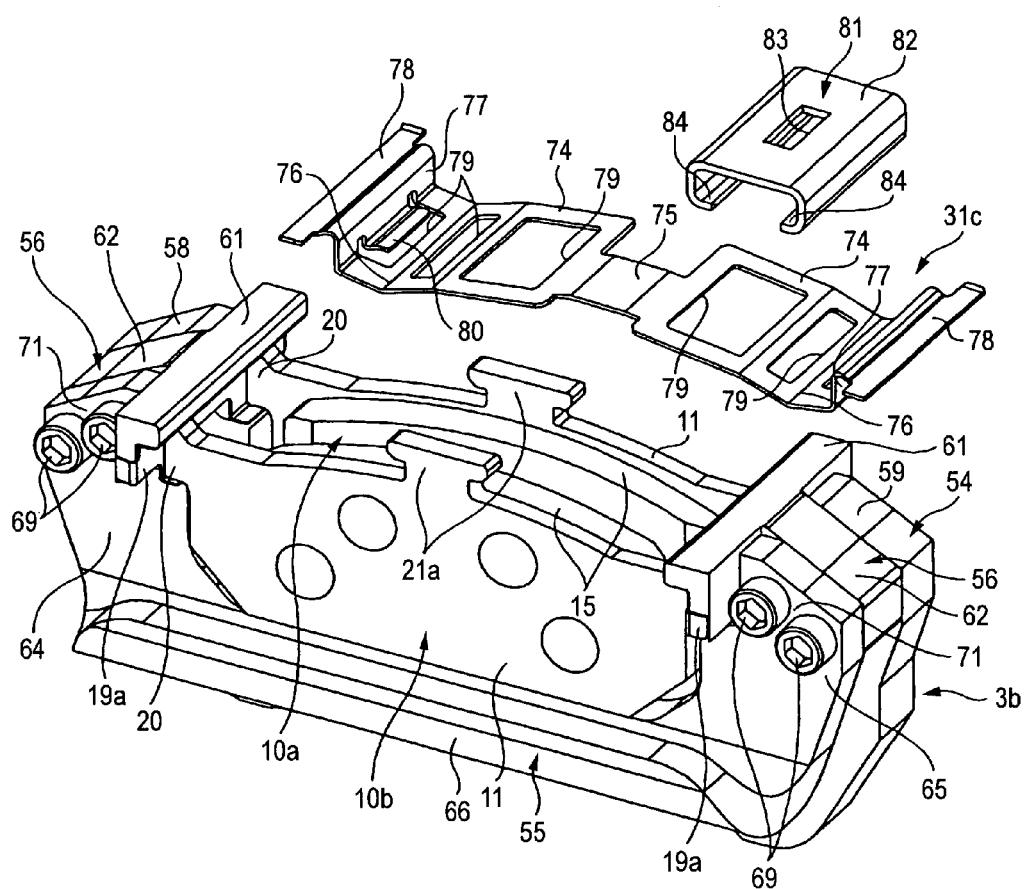
FIG. 19 is a perspective view showing a state in which a hold spring and a holding member are installed on an assembly of a support member and a pair of pads.
Figure 20:
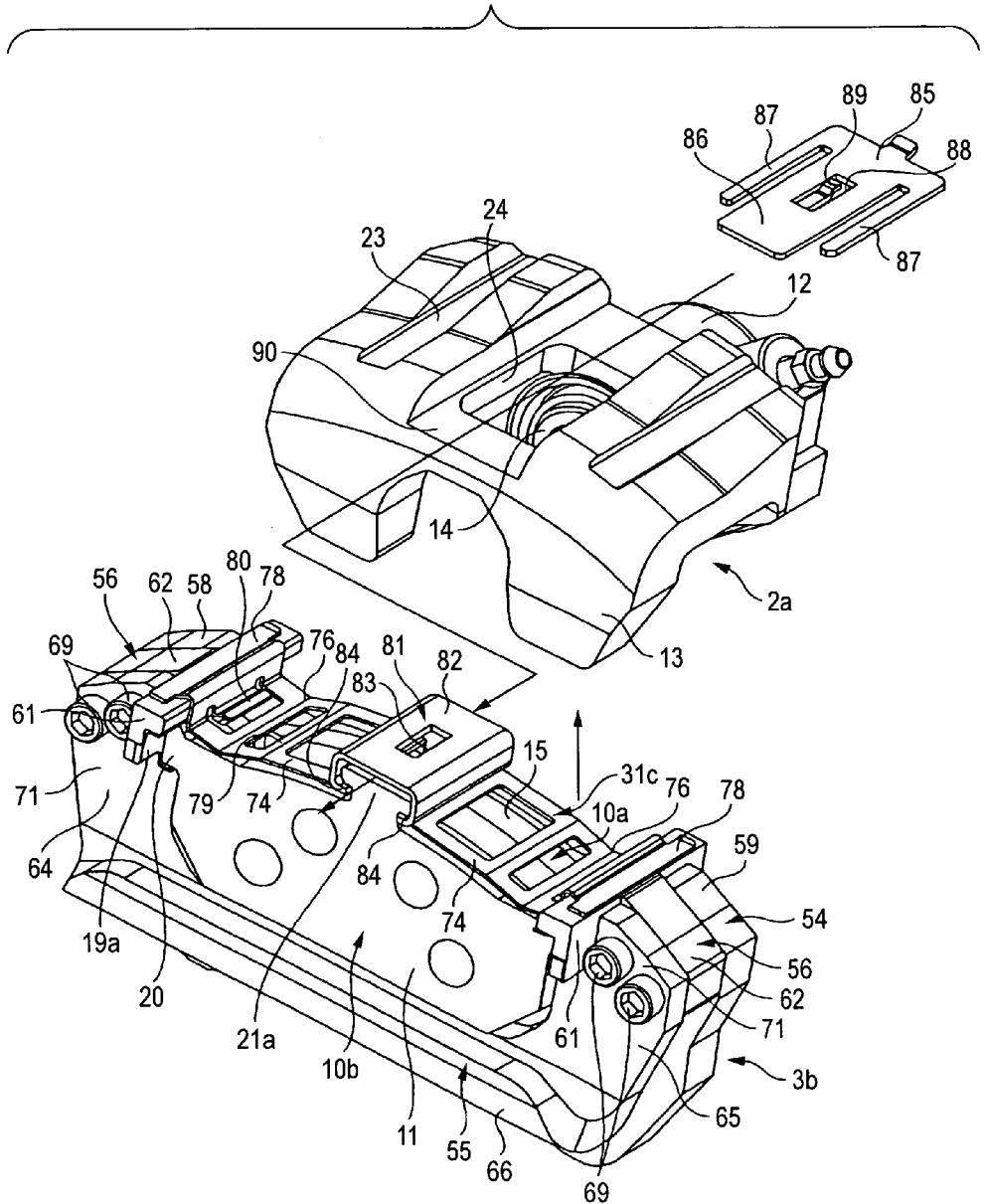
FIG. 20 is a perspective view showing a state in which a caliper and a holding member are installed on an assembly of a support member and a pair of pads, and a hold spring and a holding member.

Furthermore, in the case of the embodiment, a locking clip 28a which prevents the separation of a guide pin 26 from the caliper 2a is formed into a shape that is illustrated in detail in FIG. 15. Namely, the locking clip 28a includes a pair of leg portions 40, 40 which are in parallel with each other and a connecting portion 41 which connects ends of the leg portions 40, 40. Then, the connecting portion 41 is formed by being bent at right angles relative to longitudinal directions of the respective leg portions 40, 40. Thus, by bending the connecting portion 41 in the manner that has been described above, this bent portion is brought into abutment with a side edge of a projection 21 formed on the pressure plate 11 in such a state that the locking clip 28a is locked on the guide pin 26, whereby the positioning of the locking clip 28a is realized. In the locking clip 28a that is configured as has been described above, the leg portion 40 of the pair of leg portions 40, 40 is passed through a through hole 27 formed in the guide pin 26, and the other leg portion 40 is elastically pressed against an outer circumferential surface of the guide pin 26, whereby the locking clip 28a is locked on the guide pin 26. Also with the locking clip 28a that is configured in this way, the separation of the guide pin 26 from the caliper 2a can be disabled. Namely, an inner side displacement of the guide pin 26 relative to the caliper 2a is prevented through the impingement of an inner side end portion of the guide pin 26 an outer circumferential surface of on a bottom portion of a recessed hole 42 provided in the caliper 2a. In addition, an outer side displacement of the guide pin 26 relative to the caliper 2a is prevented through the impingement of the locking clip 28a on the internal side of the pressure plate 11 which constitutes the outer side pad 10b. Due to this, the guide pin 26 is made incapable of being separated apart from the caliper 2a in such a state that the locking clip 28a is locked on the guide pin 26.

Since the other configurations and function of the third embodiment are similar to those of the second embodiment that is shown in FIGS. 6 to 10, like reference numerals are imparted to like constituent components or members to those of the first embodiment, and repeated descriptions thereof will be omitted herein.

Fourth Embodiment

Next, FIGS. 16 to 20 show a floating caliper disc brake according to a fourth embodiment of the present invention. In the case of the embodiment, as shown in detail in FIG. 18, a support member 3b includes an inner side mount member 54 disposed at a position which deviates further inner side (rightward in FIG. 16 and a direction farther away from the viewer in FIG. 17) than a rotor 1, an outer side reinforcement member 55 disposed at a position which deviates further outer side (leftward in FIG. 16 and a direction toward the viewer in FIG. 17) than the rotor 1, a pair of torque receiving members 56, 56 which connect end portions of the inner side mount member 54 and the outer side reinforcement member 55 with respect to a circumferential direction of the rotor 1 and a pair of pad clips 19a, 19a which are mounted on the respective torque receiving members 56, 56. Among them, the inner side mount member 54 is such as to be made of a sheet metal such as a rolled sheet steel which has a certain thickness and which is formed into a substantially U-shaped flat plate, and a pair of threaded holes 57, 57 are formed in the inner side mount member 54 at a lower end portion thereof in such a manner as to penetrate through the inner side mount member 54 from side to side for connecting the mount member 54 to a vehicle body with bolts, not shown. In addition, a pair of rotation input side and rotation output side arm portions 58, 59 are provided at end portions of the inner side mount member 54 in a rotational direction of the rotor 1 (a lateral direction in FIGS. 17, 18). Then, a pair of threaded holes 60, 60 are formed in a distal end portion of each of the rotation input side and rotation output side arm portions 58, 59. Each pair of threaded holes 60, 60 are formed at positions which deviate further outward than an outer circumferential edge of the rotor 1 with respect to a diametric direction of the rotor 1.

On the other hand, the respective torque receiving members 56, 56 are each made of metal such as steel. Anchor portions 61, 61 which are on sides that face respective pads 10a, 10b (FIGS. 1, 19, 20) and connecting portions 62, 62 which are on opposite sides to the respective pads 10a, 10b are formed integrally. Among them, as to the respective connecting portions 62, 62, side surfaces thereof with respect to an axial direction of the rotor 1 are made into flat planes which are in parallel with each other. In addition, through holes 63, 63 are formed in the connecting portions 62, 62 at two locations thereon which are in alignment with the respective threaded holes 60, 60 formed in the respective rotation input side and rotation output side arm portion 58, 59 which are provided on the inner side mount member 54 in such a state that the through holes so formed penetrate through the respective connecting portions 62, 62 from side to side.

In addition, the outer side reinforcement member 55 is such as to be integrally formed by bending a sheet metal such as a rolled sheet steel having a certain thickness, and rotation input side and rotation output side arm portions 64, 65 are provided at portions of the outer side reinforcement member 55 which are situated closer to one side (a deeper side as viewed in FIG. 18) thereof with respect to an axial direction of the rotor 1 in such a manner as to be spaced away from each other in the circumferential direction of the rotor 1. In addition, a reinforcement portion 66 is formed on the other side (a side toward the viewer as viewed in FIG. 18) of the outer side reinforcement member 55 with respect to the axial direction of the rotor 1 by bending a portion of the outer side reinforcement member 55 which is close to the other side thereof radially outward of the rotor 1. In addition, through holes 67, 67 are formed in distal end portions of the rotation input side and rotation output side arm portions 64, 65 at two locations which are in alignment with the respective through holes 63, 63 which are formed in the connecting portions 62, 62 of the respective torque receiving members 56, 56 in such a state that the through holes penetrate the distal end portions from side to side. In addition, stepped portions 68, 68 are formed on internal surfaces (surfaces constituting a center of the support member 3b in a width direction thereof) of the rotation input side and rotation output side arm portions 58, 64, 59, 65 at portions which are situated toward upper ends of the respective arm portions.

Then, in such a state that the respective through holes 67, 67 formed in the outer side reinforcement member 55, the respective through holes 63, 63 formed in the respective connecting portions 62, 62 and the respective threaded holes 60, 60 formed in the rotation input side and rotation output side arm portions 58, 59 of the inner side mount member 54 are aligned with one another, externally threaded portions of bolts 69, 69 which are passed through the respective through holes 67, 63 from the side of the outer side reinforcement member 55 are screwed into the respective threaded holes 60, 60 for further fastening. Then, according to this configuration, the inner side mount member 54, the respective torque receiving members 56, 56 and the outer side reinforcement member 55 are connected together at a position which deviates further outward than the outer circumferential edge of the rotor 1 with respect to the diametric direction of the rotor 1 when in use.

In addition, portions of the respective torque receiving members 56, 56 which are toward longitudinal end portions of the anchor portions 61, 61 are made to project from both sides of the respective connecting portions 62, 62 toward the outer side reinforcement member 55 and the inner side mount member 54, respectively. Furthermore, portions of the respective anchor portions 61, 61 which are toward the longitudinal end portions thereof are made to project through the inside of the stepped portions 68, 68 that are formed in the outer side reinforcement member 55 and the inner side mount member 54 further outer side and inner side than the outer side reinforcement member 55 and the inner side mount member 54, respectively. In addition, pad clips 19a, 19a are mounted in such a manner as to cover internal surfaces (surfaces constituting the center of the support member 3b in the width direction thereof) of the anchor portions 61, 61, respectively. Additionally, upper surfaces of the stepped portions 68, 68 provided on the outer side reinforcement member 55 and upper surfaces of the stepped portions 68, 68 formed on the inner side mount member 54 are covered by projecting pieces 70, 70 with an L-shaped cross section which are provided in pair at a lower end edge of each of the respective pad clips 19a, 19a.

Then, a pair of arm portions 71, 71 which are spaced apart from each other in the circumferential direction of the rotor 1 are made up of the respective torque receiving members 56, 56, the rotation input side and rotation output side arm portions 58, 59 of the inner side mount member 54 and the rotation input side and rotation output side arm portions 64, 65 of the outer side reinforcement member 55, and an intermediate portion of the caliper 2a is disposed between the arm portions 71, 71 so made up. In this state, gaps larger than the thickness of a hold spring 31c are formed between side surfaces of upper end portions of the respective anchor portions 61, 61 and the caliper 2a, which gaps will be described later on, respectively.

In addition, engagement projections 20, 20 provided at end portions of the respective pads 10a, 10b in a width direction thereof are brought into engagement with locking grooves 72, 72 with a substantially fallen U-shaped which are made up of the internal surfaces of the respective anchor portions 61, 61 and the respective stepped portions 68, 68 of the inner side mount member 54 and the outer side reinforcement member 55 via the respective pad clips 19a, 19a. In the case of the embodiment, the respective locking grooves 72, 72 correspond to a recessed groove. Furthermore, in the case of the embodiment, the respective engagement projections 20, 20 are elastically pressed against side surfaces of the stepped portions 68, 68 of the rotation input side and rotation output side engagement portions 58, 59, 64, 65 which are formed on the inner side mount member 54 and the outer side reinforcement member 55, respectively, by means of the hold spring 31c. Due to this, in the case of the embodiment, the hold spring 13c is formed as shown in detail in FIG. 19. Namely, the hold spring 31c is made up by connecting a pair of pressing pieces 74, 74 which are provided at ends thereof together via a connecting portion 75. Additionally, portions of the respective pressing pieces 74, 74 which are toward ends thereof which constitute ends of the hold spring 31c are bent inward with respect to the radial direction of the rotor 1 so as to form a substantially V-shaped form, so that radially inward pressing portions 76, 76 are provided which are adapted to be pressed against outer circumferential edges of pressure plates 11, 11 which make up the pads 10a, 10b, respectively. Additionally, portions of the respective pressing pieces 74, 74 which deviate further outer side to the ends thereof than the respective radially inward pressing portions 76, 76 are bent outward to thereby form entering portions 77, 77 which are adapted to freely enter gaps formed between side surfaces of the caliper 2a in a width direction thereof and the side surfaces of the upper end portions of the respective anchor portions 61, 61. Then, radially outward pressing portions 78, 78 are provided on portions of end portions of the respective pressing pieces 74, 74 which project radially outward of the rotor 1 from the gap portions in such a manner as to come freely to strike external surfaces of the respective anchor portions 61, 61. In addition, penetrating holes 79, 79 are formed at a plurality of locations in longitudinal directions of the respective pressing pieces 74, 74, and of the respective penetrating holes 79, 79 so formed, projecting pieces 80, 80 are formed on inner circumferential edges of the pair of penetrating holes 79, 79 situated at the end portions of the pressing pieces 74, 74 at portions corresponding to distal end portions of the respective entering portions 77, 77 in such a manner as to project toward a longitudinal center of the hold spring 31c.

In the hold spring 31c that is configured as has been described above, the radially inward pressing portions 76, 76 of the respective pressing pieces 74, 74 are elastically pressed against two locations which are spaced apart from each other in the circumferential direction of the rotor 1 on the outer circumferential edges of the pressure plates 11, 11, which make up the pads 10a, 10b, respectively, in such a state that the connecting portion 75 is made to enter between projections 21a, 21a which are provided at widthwise central portions of the pressure plates 11, 11 which make up the pads 10a, 10b, respectively. In addition, the radially outward pressing portions 78, 78 of the respective pressing pieces 74, 74 are elastically pressed against the external surfaces of the respective anchor portions 61, 61. Furthermore, the projecting pieces 80, 80 which are formed on the inner circumferential edges of the pair of penetrating holes 79, 79 of the respective penetrating holes 79, 79 which are situated at the ends of the respective pressing pieces 74, 74 are elastically pressed against the end portions of the internal surfaces of the caliper 2a in the width direction thereof.

In addition, the projections 21a, 21a which are formed at the widthwise central portions of the pressure plates 11, 11 of the respective pads 10a, 10b are each formed into a shape with a substantially T-shaped cross section in which the width of the projection 21 in the circumferential direction of the rotor 1 is increased at a distal end portion thereof. Then, the distal end portions of the respective projections 21a, 21a are fitted in an interior of a holding member 81 that is fabricated by bending a sheet metal into a shape with a substantially C-shaped cross section. This holding member 81 has an opening which opens radially inward of the rotor 1. In addition, a through hole 83 is formed in a bottom plate portion 82 which makes up the holding member 81. The projections 21a, 21a which are formed on the pressure plates 11, 11 of the respective pads 10a, 10b are fitted in the holding member 81 at portions of the same member which are toward longitudinal end portions thereof in such a manner as to enable the relative movement of the projections 21a, 21a with respect to the axial direction of the rotor 1 in such a state that the holding member 81 straddles the outer circumferential edge of the rotor 1. Additionally, the distal end portions of the projections 21a, 21a of the respective pads 10a, 10b are prevented from being dislodged radially inward of the rotor 1 from the inside of the holding member 81 by a pair of bent pieces 84, 84 provided at distal end portions of the holding member 81.

Furthermore, the holding member 81 is passed through a penetrating hole 24 formed at a central portion of a bridge portion 23 of the caliper 2a from inward to outward with respect to the radial direction of the rotor 1, and a portion of the holding member 81 which is toward the bottom plate portion 82 is made to project outward from an external surface of the bridge portion 23. Then, a locking member 85 that is placed on the external surface of the bride portion inserted in the axial direction of the rotor 1 in the inside of the portion of the holding member 81 which is made to project outward. The locking member 85 is such as to be made of a sheet metal and includes, as is shown in detail in FIG. 20, a main body portion 86 and a pair of L-shaped locking arm portions 87, 87 whose proximal end portions are connected to portions (deeper portions as viewed in FIG. 20) of the main body portion 86 which are toward side edges in the width direction (a lateral direction in FIG. 20) of the main body portion 86 and are close to a longitudinal end thereof. In addition, a distal end portion of an inner part of a fallen U-shaped notch 88 formed in a central portion of the main body portion 86 is bent radially outward of the rotor 1, whereby a locking projection 89 is provided.

Then, the holding member 81 is passed into the inside of the penetrating hole 24 formed in the bridge portion 23 in such a state that the projections 21a, 21a of the respective pads 10a, 10b are fitted in the holding member 81, and a distal half portion of the main body portion 86 of the locking member 85 is inserted in the axial direction of the rotor 1 between an internal surface of the bottom plate portion 82 and distal end edges of the respective projections 21a, 21a inside the portion of the holding member 81 which is toward the bottom plate portion 82 and which is made to project from the external surface of the bridge portion 23. In conjunction with this, a portion of the distal end portion of the main body portion 86 which projects in the axial direction of the rotor 1 from the inside of the holding member 81 and, a proximal end portion and the pair of locking arm portions 87, 87 of the main body portion 86 are placed on a plane portion 90 formed on the external surface of the bridge portion 23 around a circumferential edge portion of an opening in the penetrating hole 24. In this configuration, the locking member 85 is kept from moving radially inward of the rotor 1 relative to the caliper 2a and is in engagement with the holding member 81.

In addition, in the case of the embodiment, the locking projection 89 formed at an intermediate portion of the locking member 85 is brought into engagement with the through hole 83 formed in the holding member 81, whereby the locking member 85 is prevented from being abruptly dislodged from the inside of the holding member 81 in the axial direction of the rotor 1. When taking out the locking member 85 from the inside of the holding member 81, the distal end portion of the locking projection 89 is elastically deformed radially inward of the rotor 1, and the main body portion 86 of the locking member 85 is pulled out of the inside of the holding member 81 in the axial direction of the rotor 1.

According to the configuration that has been described heretofore, the engagement projections 20, 20 provided at the end portions of the pressure plates 11, 11 which make up the pads 10a, 10b, respectively, in the width direction thereof are elastically pressed against the side surfaces of the stepped portions 68, 68 of the respective rotation input side and rotation output side engagement portions 58, 59, 4, 65 by means of the hold spring 31c. Namely, the respective projecting pieces 80, 80 of the hold spring 31c are elastically pressed against the end portions on the internal surface of the caliper 2a in the width direction thereof radially outward of the rotor 1, and the respective radially inward pressing portions 76, 76 of the hold spring 31c are elastically pressed against the outer circumferential edges of the pressure plates 11, 11 radially inward of the rotor 1. In this configuration, the respective engagement projections 20, 20 are elastically pressed against the side surfaces of the respective stepped portions 68, 68 via the pad clips 19a, 19a. While, due to this, the caliper 2a is elastically pulled up radially outward of the rotor 1 relative to the support member 3b, the displace of the caliper with respect to the radial direction of the rotor 1 is restricted by virtue of the engagement of the locking member 85 and the holding member 81 which are placed on the caliper 2a and the engagement of the holding member 81 and the projections 21a, 21a of the respective pressure plates 11, 11. In addition, in this state, the respective pads 10a, 10b are allowed to move in the axial direction of the rotor 1 relative to the support member 3b. Note that while the external side surfaces of the engagement projections 20, 20 of the respective pads 10a, 10b with respect to the radial direction of the rotor 1 and the side surfaces of the pad clips 19a, 19a are illustrated as being in abutment with each other in FIG. 17, in reality, a minute gap exists between both the side surfaces. In addition, in the case of the embodiment, the holding member 81 which is kept from moving radially outward of the rotor 1 by virtue of the engagement with the respective pads 10a, 10b and the locking member 85 which is brought into engagement with the holding member 81 constitute the supporting means.

Also in the case of the floating caliper disc brake of the embodiment that is configured as has been described heretofore, the caliper 2a is disposed between the pair of arm portions 71, 71 which are provided on the support member 3b in such a manner as to be separated apart from each other in the circumferential direction of the rotor 1. Due to this, the movement of the caliper 2a in the circumferential direction of the rotor 1 can be restricted, and the prevention of rotation of the caliper 2a can be realized. Moreover, also in the case of the embodiment, being different from the related art construction illustrated in FIGS. 21 to 24, the necessity is obviated of connecting the anti-rotation pin 45 (refer to FIGS. 21, 23) that realizes the prevention of rotation of the caliper 2a to the support member 3b and forming the U-shaped notch 44 (refer to FIGS. 21, 23) in the caliper 2a for engagement with the anti-rotation pin 45, thereby making it possible to reduce the production costs of the disc brake.

Furthermore, in the case of the embodiment, being different from the first to third embodiments, in order to guide the caliper 2a for movement in the axial direction of the rotor 1 relative to the respective pads 10a, 10b, the recessed hole 42 which is the guide pin 26 inserting hole portion and the through hole 25 (refer to FIG. 1 and the like) which is the penetrating hole do not have to be formed in the caliper 2a and the respective pads 10a, 10b, facilitating the realization of cost reduction.

Since the other configurations and function of this embodiment are similar to those of the first embodiment which is illustrated in FIGS. 1 to 5, like reference numerals are imparted to like constituent components or members to those of the first embodiment, and repeated descriptions thereof will be omitted herein.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A floating caliper disc brake comprising:
a support member fixed to a vehicle body;
a pair of pads disposed at both axial sides of a rotor and movably guided in an axial direction of the rotor by the support member;
a pair of arm portions formed in the support member, wherein one of the arm portions and the other of the arm portions are separated apart from each other in a circumferential direction of the rotor;
a caliper disposed between the pair of arm portions so as to be kept from moving in the circumferential direction of the rotor and supported by the pair of pads; and
supporting means provided between the pair of pads and the caliper and for supporting the caliper so that the caliper is movable in the axial direction of the rotor, and the caliper is attachable to and detachable from the support member,
wherein the caliper comprises:
a bridge portion straddling the rotor and the pair of pads;
a claw portion provided at one end of the bridge portion; and
a cylinder portion provided at the other end of the bridge portion, wherein a piston is fittingly mounted in the cylinder portion,
further comprising an opening provided in the bridge portion that penetrates through the bridge portion in a radial direction of the rotor;
wherein the supporting means comprises:
a holding member kept from moving in a radially outward direction of the rotor through engagement with the pair of pads, the holding member projecting outwards of the bridge portion from the opening of the bridge portion; and
a locking member that keeps the caliper from moving in the radial direction of the rotor through engagement with the holding member; and
wherein the holding member is passed through the opening from inward to outward with respect to the radial direction of the rotor, and
the locking member is inserted in the axial direction of the rotor between radially outward edges of the pads and the holding member.

2. The floating caliper disc brake according to claim 1, wherein the holding member is formed into a shape with a substantially C-shaped cross section that straddles the rotor and which is made to open radially inwards of the rotor, and each of the pair of pads comprises a projection projecting in the radial direction of the rotor and having a substantially T-shaped cross section, wherein each of the projection fits in the holding member and is movable in the axial direction of the rotor.

3. The floating caliper discbrake according to claim 2, wherein the pair of pads are movably guided in the axial direction of the rotor relative to the support member through engagement of a recessed groove provided on one of the pair of pads and the support member with a raised portion provided on the other thereof.

4. The floating caliper disc brake according to claim 1, wherein the pair of pads are movably guided in the axial direction of the rotor relative to the support member through engagement of a recessed groove provided on one of the pair of pads and the support member with a raised portion provided on the other thereof.

5. The floating caliper disc brake according to claim 4, further comprising:
a holding spring disposed between the caliper and the pair of pads and the support member and for pressing the pair of pads to the support member in the radial direction so that the raised portion and the recessed groove are engaged.

* * * * *